United States Patent
Matsumoto et al.

(10) Patent No.: US 7,909,926 B2
(45) Date of Patent: Mar. 22, 2011

(54) INK COMPOSITION AND COLORED PRODUCT

(75) Inventors: Hiroyuki Matsumoto, Kita-ku (JP); Yutaka Ishii, Kita-ku (JP); Noriko Kajiura, Kita-ku (JP); Makiko Kogo, Kita-ku (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 80 days.

(21) Appl. No.: 12/309,932

(22) PCT Filed: Aug. 8, 2007

(86) PCT No.: PCT/JP2007/065509
§ 371 (c)(1),
(2), (4) Date: Feb. 3, 2009

(87) PCT Pub. No.: WO2008/018495
PCT Pub. Date: Feb. 14, 2008

(65) Prior Publication Data
US 2009/0324900 A1 Dec. 31, 2009

(30) Foreign Application Priority Data
Aug. 11, 2006 (JP) ................................. 2006-220556

(51) Int. Cl.
*C09D 11/02* (2006.01)
*B41J 2/01* (2006.01)

(52) U.S. Cl. ..................................... 106/31.47; 347/100
(58) Field of Classification Search ............... 106/31.47; 546/76; 347/100; 428/195.1
See application file for complete search history.

(56) References Cited

U.S. PATENT DOCUMENTS

| | | | |
|---|---|---|---|
| 4,446,470 A * | 5/1984 | Sugiyama et al. | 106/31.47 |
| 6,152,969 A | 11/2000 | Matsumoto et al. | 8/658 |
| 6,843,839 B2 * | 1/2005 | Kanke et al. | 106/31.47 |
| 6,949,135 B2 * | 9/2005 | Ishibashi et al. | 106/31.47 |
| 7,223,301 B2 * | 5/2007 | Matsumoto et al. | 106/31.47 |
| 7,691,191 B2 * | 4/2010 | Matsumoto et al. | 106/31.47 |
| 2010/0075112 A1 * | 3/2010 | Ishii et al. | 546/76 |

FOREIGN PATENT DOCUMENTS

| | | |
|---|---|---|
| JP | 2006-124611 | 5/2006 |
| WO | 98/11167 | 3/1998 |

OTHER PUBLICATIONS

The International Search Report dated Nov. 6, 2007.

* cited by examiner

*Primary Examiner* — Helene Klemanski
(74) *Attorney, Agent, or Firm* — Nields, Lemack & Frame, LLC

(57) ABSTRACT

The present invention relates to an ammonium salt or a sodium salt of an anthrapyridone compound represented by the following the formula (1):

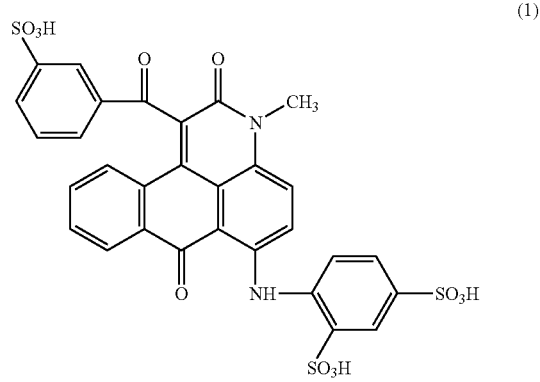

(1)

and an ink composition containing these; said compound has a hue with high vividness and high brightness suitable for inkjet recording; recorded matters recorded with an ink composition containing said compound is excellent in fastnesses such as light fastness and ozone fastness, and also particularly water fastness.

13 Claims, 38 Drawing Sheets

| | INDEX | FREQUENCY | PPM | HEIGHT |
|---|---|---|---|---|
| 15mg / DMSO-D6 | 1 | 3387.063 | 8.471 | 33.7 |
| | 2 | 3385.781 | 8.467 | 35.7 |
| No.00020 | 3 | 3379.189 | 8.451 | 37.9 |
| 060628 | 4 | 3377.907 | 8.448 | 36.5 |
| OP Y.Nakagawa & M. Satoh | 5 | 3248.148 | 8.231 | 33.5 |
| | 6 | 3282.316 | 8.209 | 60.5 |
| Pulse Sequence: s2pul | 7 | 3280.668 | 8.205 | 34.0 |
| | 8 | 3256.862 | 8.145 | 43.0 |
| | 9 | 3254.848 | 8.140 | 42.2 |
| Solvent: DMSO | 10 | 3203.756 | 8.012 | 49.7 |
| Ambient temperature | 11 | 3194.051 | 7.988 | 62.0 |
| Sample #8, Operator, vnmr1 | 12 | 3159.624 | 7.902 | 53.1 |
| INOVA-400 "varian" | 13 | 3158.708 | 7.900 | 48.6 |
| | 14 | 3151.932 | 7.883 | 59.1 |
| | 15 | 3127.577 | 7.822 | 43.2 |
| | 16 | 3119.336 | 7.801 | 52.5 |
| Relax. delay 1.500 sec | 17 | 3109.448 | 7.776 | 45.7 |
| Pulse 45.0 degrees | 18 | 3099.742 | 7.752 | 41.3 |
| Acq. time 3.500 sec | 19 | 3091.868 | 7.732 | 22.0 |
| Width 6000.6 Hz | 20 | 3090.769 | 7.730 | 21.8 |
| 16 repetitions | 21 | 3083.810 | 7.712 | 42.7 |
| OBSERVE H1, 399.8593698 MHz | 22 | 3076.852 | 7.695 | 29.8 |
| DATA PROCESSING | 23 | 3075.753 | 7.692 | 30.1 |
| Line broadening 0.2 MHz | 24 | 3051.397 | 7.631 | 31.6 |
| FT size 65536 | 25 | 3049.749 | 7.627 | 30.2 |
| Total time 1 min, 20 sec | 26 | 3044.072 | 7.613 | 27.7 |
| | 27 | 3042.974 | 7.610 | 34.6 |
| | 28 | 3041.692 | 7.607 | 30.1 |
| | 29 | 3036.015 | 7.593 | 43.5 |
| | 30 | 3034.367 | 7.589 | 43.8 |
| | 31 | 3028.141 | 7.573 | 31.3 |
| | 32 | 3026.309 | 7.568 | 30.3 |
| | 33 | 3004.701 | 7.514 | 27.1 |
| | 34 | 2997.010 | 7.495 | 47.3 |
| | 35 | 2989.135 | 7.475 | 23.5 |
| | 36 | 2971.922 | 7.432 | 43.1 |
| | 37 | 2963.681 | 7.412 | 35.0 |
| | 38 | 2845.749 | 7.117 | 164.7 |

[FIG.27]
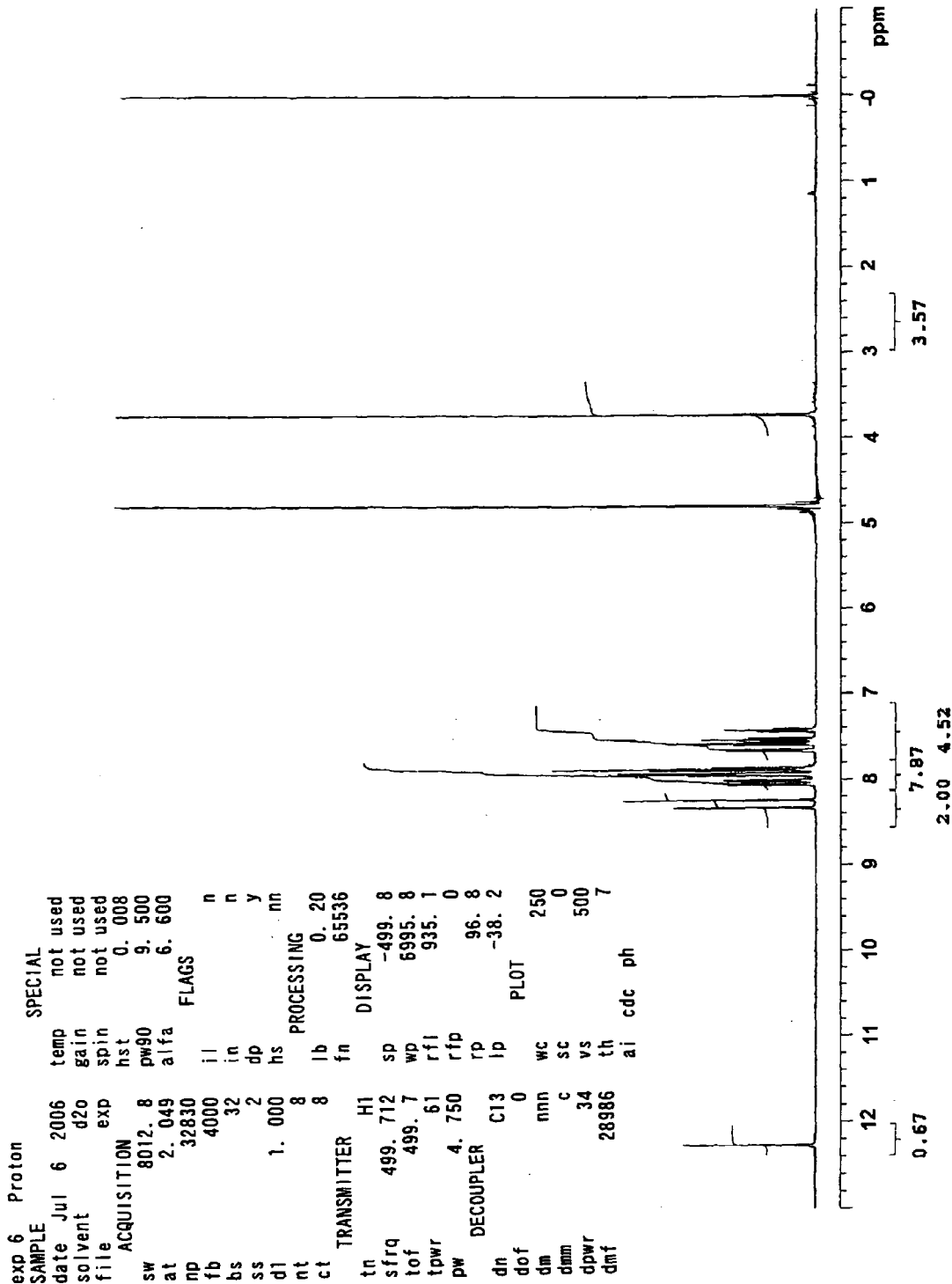

[FIG.28]
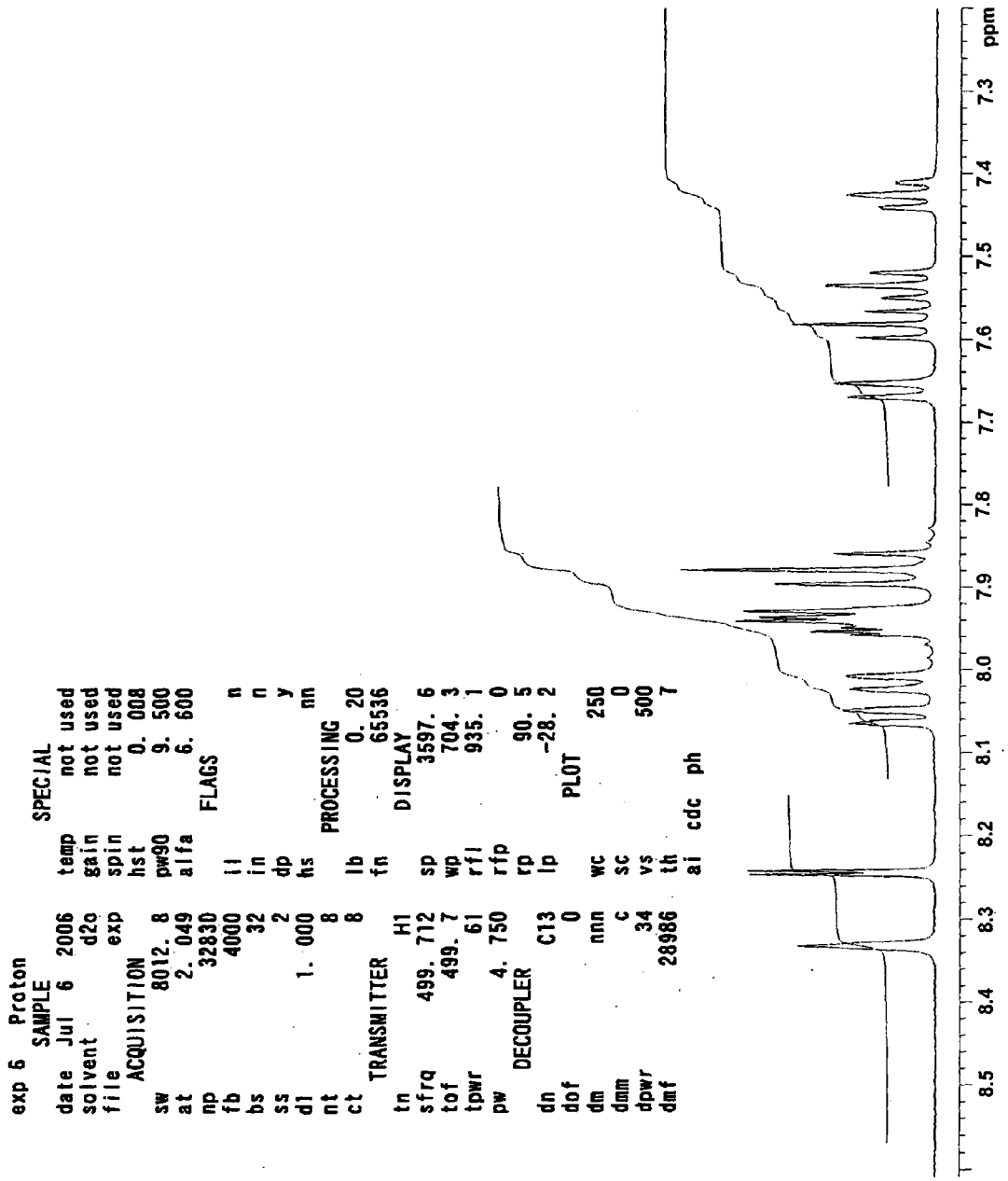

[FIG.29]

File: magenta-hma-mc4
Pulse Sequence: s2pul

Solvent: d2o
Ambient temperature
Operator: vnmr1
File: magenta-hma-mc4
VNMRS-500 "varian500"

Relax. delay 1.000 sec
Pulse 45.0 degrees
Acq. time 2.049 sec
Width 8012.8 Hz
8 repetitions
OBSERVE H1, 499.7087315MHz
DATA PROCESSING
 Line broadening 0.2 Hz
FT size 65536
Total time 0 min, 30 sec

| INDEX | FREQUENCY | PPM | HEIGHT | INDEX | FREQUENCY | PPM | HEIGHT |
|---|---|---|---|---|---|---|---|
| 1 | 6133.349 | 12.274 | 64.4 | 35 | 2397.880 | 4.799 | 38.0 |
| 2 | 4163.644 | 8.332 | 69.4 | 36 | 2397.391 | 4.798 | 43.6 |
| 3 | 4120.607 | 8.246 | 93.0 | 37 | 2396.901 | 4.797 | 51.8 |
| 4 | 4118.406 | 8.242 | 93.9 | 38 | 2396.412 | 4.796 | 59.0 |
| 5 | 4031.108 | 8.067 | 33.7 | 39 | 2392.989 | 4.789 | 6952.8 |
| 6 | 4029.885 | 8.064 | 43.6 | 40 | 2390.788 | 4.784 | 76.8 |
| 7 | 4028.174 | 8.061 | 33.5 | 41 | 2390.299 | 4.783 | 46.2 |
| 8 | 4023.283 | 8.051 | 36.8 | 42 | 2389.810 | 4.782 | 45.1 |
| 9 | 4022.060 | 8.049 | 46.3 | 43 | 2389.321 | 4.781 | 32.0 |
| 10 | 4020.349 | 8.045 | 35.5 | 44 | 1861.132 | 3.724 | 395.3 |
| 11 | 4009.100 | 8.023 | 43.7 | 45 | 3.423 | 0.007 | 33.7 |
| 12 | 4001.275 | 8.007 | 45.4 | 46 | 1.956 | 0.004 | 33.8 |
| 13 | 3976.333 | 7.957 | 42.8 | 47 | 0.000 | 0.000 | 1060.8 |
| 14 | 3974.377 | 7.953 | 62.8 | 48 | -3.179 | -0.006 | 32.8 |
| 15 | 3971.687 | 7.948 | 47.5 | | | | |
| 16 | 3968.019 | 7.941 | 100.7 | | | | |
| 17 | 3965.573 | 7.936 | 88.5 | | | | |
| 18 | 3961.905 | 7.928 | 96.7 | | | | |
| 19 | 3945.277 | 7.895 | 81.0 | | | | |
| 20 | 3936.963 | 7.879 | 128.7 | | | | |
| 21 | 3926.937 | 7.858 | 51.2 | | | | |
| 22 | 3832.304 | 7.669 | 44.5 | | | | |
| 23 | 3823.989 | 7.652 | 51.7 | | | | |
| 24 | 3796.113 | 7.597 | 40.8 | | | | |
| 25 | 3788.288 | 7.581 | 73.2 | | | | |
| 26 | 3780.463 | 7.565 | 36.2 | | | | |
| 27 | 3772.149 | 7.549 | 27.8 | | | | |
| 28 | 3764.813 | 7.534 | 56.3 | | | | |
| 29 | 3757.232 | 7.519 | 33.7 | | | | |
| 30 | 3718.841 | 7.442 | 28.3 | | | | |
| 31 | 3717.374 | 7.439 | 29.6 | | | | |
| 32 | 3710.527 | 7.425 | 45.7 | | | | |
| 33 | 2398.858 | 4.801 | 29.9 | | | | |
| 34 | 2398.369 | 4.800 | 33.9 | | | | |

[FIG.32]

| INDEX | FREQUENCY | PPM | HEIGHT |
|---|---|---|---|
| 1 | 4154.108 | 8.313 | 23.5 |
| 2 | 4121.585 | 8.248 | 30.5 |
| 3 | 4119.384 | 8.244 | 30.5 |
| 4 | 4030.519 | 8.066 | 14.8 |
| 5 | 4024.017 | 8.053 | 11.2 |
| 6 | 4022.794 | 8.050 | 15.9 |
| 7 | 3973.398 | 7.951 | 16.9 |
| 8 | 3972.420 | 7.949 | 18.4 |
| 9 | 3967.041 | 7.939 | 19.8 |
| 10 | 3964.840 | 7.934 | 30.8 |
| 11 | 3958.482 | 7.922 | 35.8 |
| 12 | 3956.770 | 7.918 | 42.6 |
| 13 | 3947.478 | 7.900 | 35.9 |
| 14 | 3921.802 | 7.848 | 54.6 |
| 15 | 3912.510 | 7.830 | 29.7 |
| 16 | 3802.471 | 7.609 | 15.3 |
| 17 | 3794.157 | 7.593 | 18.7 |
| 18 | 3791.222 | 7.587 | 15.2 |
| 19 | 3783.397 | 7.571 | 23.4 |
| 20 | 3775.572 | 7.556 | 11.5 |
| 21 | 3750.141 | 7.505 | 9.4 |
| 22 | 3742.805 | 7.490 | 19.2 |
| 23 | 3735.713 | 7.476 | 11.4 |
| 24 | 3699.034 | 7.402 | 10.4 |
| 25 | 3697.566 | 7.399 | 10.6 |
| 26 | 3690.720 | 7.386 | 15.6 |
| 27 | 2395.679 | 4.794 | 827.8 |
| 28 | 1847.194 | 3.697 | 128.7 |
| 29 | 0.000 | 0.000 | 100.2 |

File:

Pulse Sequence: s2pul

Solvent: d2o
Ambient temperature
Operator: vnmr1
File: Magenta-hma-mc4-1h-30mg
VNMRS-500 "varian 500"

Relax. delay 1.000 sec
Pulse 45.0 degrees
Acq. time 2.049 sec
Width 8012.8Hz
8 repetitions
OBSERVE H1, 499.7087329 MHz
DATA PROCESSING
 Line broadening 0.2 Hz
FT size 65536
Total time 0 min, 30 sec

[FIG.35]

| INDEX | FREQUENCY | PPM | HEIGHT | | INDEX | FREQUENCY | PPM | HEIGHT |
|---|---|---|---|---|---|---|---|---|
| 1 | 4162.666 | 8.330 | 57.4 | | 35 | 2206.900 | 4.416 | 9.1 |
| 2 | 4161.199 | 8.327 | 57.3 | | 36 | 1865.534 | 3.733 | 94.4 |
| 3 | 4038.444 | 8.082 | 22.4 | | 37 | 1862.844 | 3.728 | 128.7 |
| 4 | 4032.331 | 8.069 | 20.8 | | 38 | 2.690 | 0.005 | 40.6 |
| 5 | 4020.838 | 8.046 | 22.9 | | 39 | 0.000 | 0.000 | 61.1 |
| 6 | 4013.991 | 8.033 | 17.5 | | | | | |
| 7 | 3979.023 | 7.963 | 21.3 | | | | | |
| 8 | 3976.577 | 7.958 | 23.3 | | | | | |
| 9 | 3970.464 | 7.946 | 38.3 | | | | | |
| 10 | 3968.263 | 7.941 | 40.4 | | | | | |
| 11 | 3959.460 | 7.924 | 26.6 | | | | | |
| 12 | 3956.281 | 7.917 | 20.3 | | | | | |
| 13 | 3948.701 | 7.902 | 29.1 | | | | | |
| 14 | 3946.255 | 7.897 | 40.3 | | | | | |
| 15 | 3940.387 | 7.885 | 26.9 | | | | | |
| 16 | 3937.697 | 7.880 | 34.9 | | | | | |
| 17 | 3927.916 | 7.860 | 10.8 | | | | | |
| 18 | 3886.834 | 7.778 | 23.4 | | | | | |
| 19 | 3884.878 | 7.774 | 32.2 | | | | | |
| 20 | 3878.520 | 7.762 | 19.6 | | | | | |
| 21 | 3876.319 | 7.757 | 25.9 | | | | | |
| 22 | 3803.449 | 7.611 | 18.8 | | | | | |
| 23 | 3799.781 | 7.604 | 26.8 | | | | | |
| 24 | 3796.357 | 7.597 | 28.6 | | | | | |
| 25 | 3792.445 | 7.589 | 30.7 | | | | | |
| 26 | 3785.109 | 7.575 | 23.1 | | | | | |
| 27 | 3757.966 | 7.520 | 17.9 | | | | | |
| 28 | 3754.542 | 7.513 | 21.5 | | | | | |
| 29 | 3747.451 | 7.499 | 10.8 | | | | | |
| 30 | 3695.366 | 7.395 | 15.6 | | | | | |
| 31 | 3688.519 | 7.381 | 20.5 | | | | | |
| 32 | 3681.427 | 7.367 | 8.8 | | | | | |
| 33 | 2246.514 | 4.496 | 26.8 | | | | | |
| 34 | 2226.463 | 4.456 | 1604.1 | | | | | |

File:
Pulse Sequence: s2pul

Solvent: d2o
Temp. 60.0 C / 333.1 K
Operator: vnmr1
File: Magenta-hma-mc4-1h-30mg60cell
VNMRS-500 "varian 500"

Relax. delay 1.000 sec
Pulse 45.0 degrees
Acq. time 2.049 sec
Width 8012.8Hz
8 repetitions
OBSERVE H1, 499.7089056 MHz
DATA PROCESSING
 Line broadening 0.2 Hz
FT size 65536
Total time 0 min, 30 sec

[FIG.36]
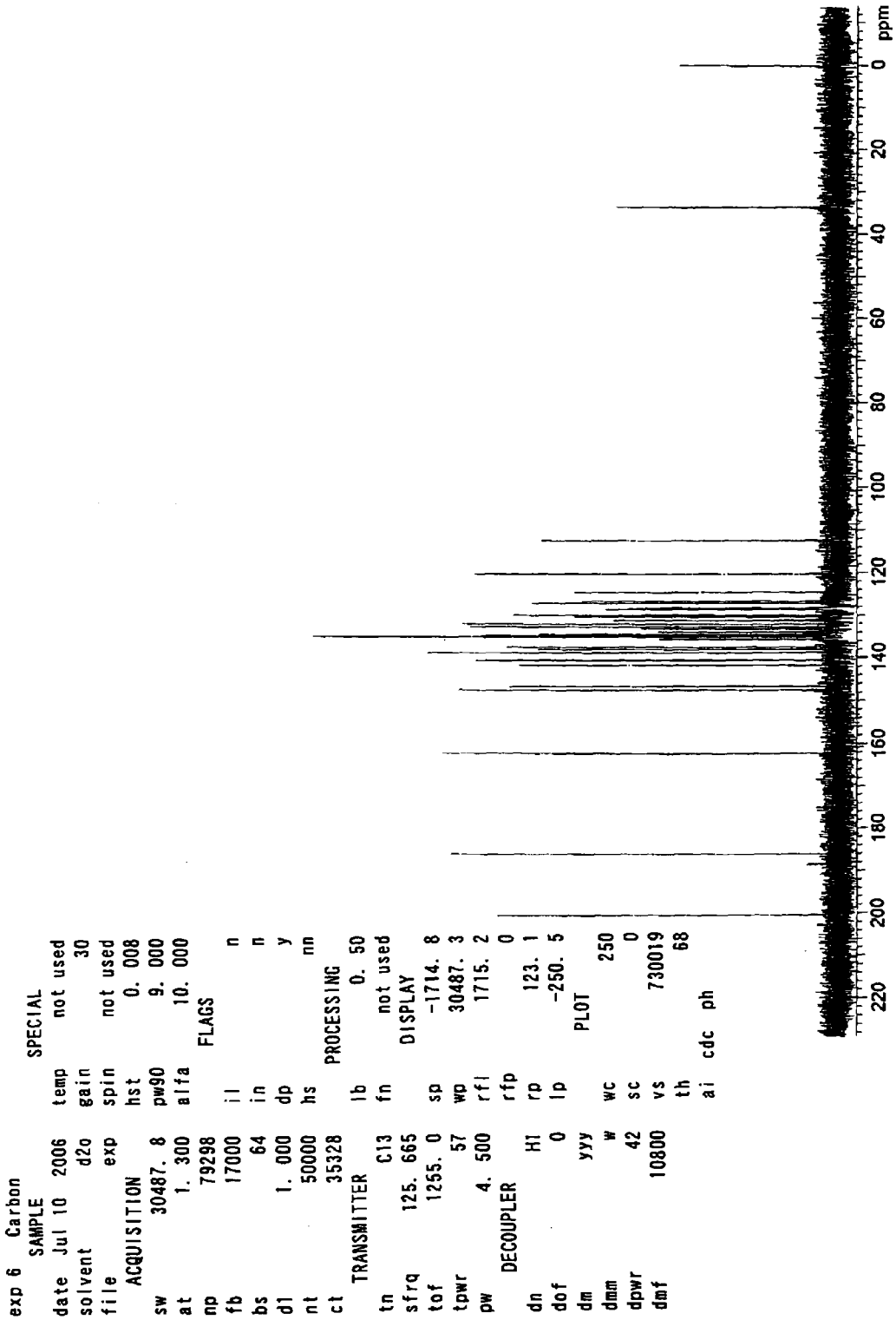

[FIG.38]

| | | | | INDEX | FREQUENCY | PPM | HEIGHT |
|---|---|---|---|---|---|---|---|
| exp6 Carbon | | | | | | | |
| SAMPLE | | SPECIAL | | | | | |
| date | Jul 10 2006 | temp | not used | 1 | 25186.771 | 200.449 | 79.7 |
| solvent | d2o | gain | 30 | 2 | 23393.398 | 186.177 | 90.7 |
| file | exp | spin | not used | 3 | 20388.161 | 162.260 | 92.7 |
| ACQUISITION | | hst | 0.008 | 4 | 18538.033 | 147.535 | 88.9 |
| sw | 30487.8 | pw90 | 9.000 | 5 | 18425.453 | 146.639 | 77.0 |
| at | 1.300 | alfa | 10.000 | 6 | 17805.797 | 141.708 | 74.8 |
| np | 79298 | FLAGS | | 7 | 17659.257 | 140.542 | 84.9 |
| fb | 17000 | il | n | 8 | 17435.958 | 138.764 | 96.5 |
| bs | 64 | in | n | 9 | 17329.891 | 137.920 | 70.4 |
| d1 | 1.000 | dp | y | 10 | 17266.622 | 137.417 | 78.0 |
| nt | 50000 | hs | nn | 11 | 17035.880 | 135.580 | 41.6 |
| ct | 35392 | PROCESSING | | 12 | 16963.307 | 135.003 | 110.2 |
| TRANSMITTER | | lb | 0.50 | 13 | 16960.981 | 134.984 | 123.5 |
| tn | C13 | fn | not used | 14 | 16918.182 | 134.644 | 83.9 |
| sfrq | 125.665 | DISPLAY | | 15 | 16888.874 | 134.410 | 70.2 |
| tof | 1255.0 | sp | -1714.8 | 16 | 16819.093 | 133.855 | 42.0 |
| tpwr | 57 | wp | 30487.3 | 17 | 16716.283 | 133.037 | 45.9 |
| pw | 4.500 | rfl | 1715.2 | 18 | 16663.249 | 132.615 | 86.4 |
| DECOUPLER | | rfp | 0 | 19 | 16580.907 | 131.959 | 88.4 |
| dn | H1 | rp | 123.1 | 20 | 16475.305 | 131.119 | 52.6 |
| dof | 0 | lp | -250.5 | 21 | 16362.260 | 130.219 | 62.0 |
| dm | yyy | PLOT | | 22 | 16323.648 | 129.912 | 76.2 |
| dmm | w | wc | 250 | 23 | 16149.660 | 128.527 | 54.4 |
| dpwr | 42 | sc | 0 | 24 | 16118.492 | 128.279 | 49.0 |
| dmf | 10800 | vs | 730019 | 25 | 15963.578 | 127.046 | 71.9 |
| | | th | 14 | 26 | 15906.822 | 126.595 | 60.3 |
| | | ai cdc ph | | 27 | 15645.841 | 124.518 | 62.0 |
| | | | | 28 | 15099.688 | 120.171 | 85.3 |
| | | | | 29 | 14119.032 | 112.367 | 69.7 |
| | | | | 30 | 4212.914 | 33.529 | 48.4 |
| | | | | 31 | 4210.123 | 33.506 | 52.3 |
| | | | | 32 | 0.000 | 0.000 | 37.3 |
| | | | | 33 | -2.791 | -0.022 | 35.5 |

INK COMPOSITION AND COLORED PRODUCT

TECHNICAL FIELD

The present invention relates to an anthrapyridone compound, an ink composition containing the compound and a colored product colored using these.

BACKGROUND ART

In the recording method by means of an inkjet printer which is one of typical methods among various color recording methods, various methods for discharging ink have been developed, and they are all a method where ink droplets are generated and adhered onto various record-receiving materials (such as paper, film and cloth) to perform recording. This recording method has been rapidly prevailing lately and is expected to continue growing remarkably in the future because of features such as quietness without noise generation due to no direct contact of a recording head with a record-receiving material and as easiness in downsizing, speedup and colorization.

Conventionally, as an ink for fountain pens, felt-tip pens or the like and as an ink for inkjet recording, water-based inks where a water-soluble dye is dissolved in an aqueous medium have been used, and in these water-based inks, a water-soluble organic solvent is generally added to prevent ink from clogging at a pen tip or an inkjet nozzle. These conventional inks are required to provide recorded images with sufficient density, not to clog at a pen tip or a nozzle, to dry quickly on a record-receiving material, to bleed less, to have excellent storage stability and so on. In addition, recorded images formed are required to have fastnesses such as water fastness, light fastness and moisture fastness.

Meanwhile, images or character information on color displays of computers are generally expressed by subtractive color mixing of 4 color inks of yellow (Y), magenta (M), cyan (C) and black (K) for color recording by an ink jet printer. In order to reproduce, as faithfully as possible, hue of an image expressed by additive color mixing of red (R), green (G) and blue (B) on CRT displays and the like, through images by subtractive color mixing, it is desired that each of Y, M and C has a hue as close to each standard as possible and also vividness. In addition, it is required that ink compositions to be used for them are stable in storage for a long period of time, and that images printed therewith have a high concentration and are excellent in fastnesses such as water fastness, light fastness, and gas fastness.

The application of inkjet printers has been widely spread in the fields ranging from small printers for office automation to large printers for industrial use, and therefore fastnesses such as water fastness, moisture fastness, light fastness, gas fastness and the like have been required more than ever. Water fastness has been largely improved by coating organic or inorganic particulates of porous silica, cation polymer, aluminasol, special ceramic and the like together with a PVA resin on a paper surface to provide an image receiving layer on a record-receiving material. "Moisture fastness" means durability against a phenomenon of bleeding of the coloring matter in a record-receiving material when the colored record-receiving material is stored under an atmosphere of high humidity. Bleeding of coloring matter extremely deteriorates image quality in images particularly required to have high resolution, photo-like image quality and therefore it is important to reduce such bleeding as far as possible. As for light fastness, technique for large improvement thereof has not established yet. In particular, many of original coloring matters for magenta among 4 primary colors of Y, M, C and K have low light fastness and therefore improvement thereof is an important problem. In addition, there are more opportunities to print pictures at home with recent spread of digital cameras, and image discoloration by oxidizing gases such as ozone gas, nitrogen oxides and the like in the air where printed matters obtained are stored is acknowledged as a problem. Oxidizing gas has a nature to react with the coloring matter on or in a recorded paper to cause discoloration or fading of the printed image. Among oxidizing gasses, ozone gas is regarded as a main causative agent accelerating color-fading of inkjet-recorded images. This phenomenon of discoloration or fading is characteristic of inkjet images, and therefore improvement of ozone gas fastness is an important challenge as well as improvement of light fastness.

"Water fastness" means durability against a phenomenon of bleeding or fading of the coloring matter in a record-receiving material in the case where water droplets dropped on the colored record-receiving material are wiped off, and therefore improvement thereof is one of important problems to solve. As for silver salt photographs, for example, even when water is carelessly poured on the surface of a photo image, the quality of the image is not particularly deteriorated if the water is wiped off.

However as for inkjet recording images, extreme deterioration of the recorded image due to bleeding or the like of the coloring matter easily occurs in the same situation though it has photo image quality, and in order to prevent this, it cannot help using a special method such as coating of the recorded image with, for example, a resin.

At present, examples of such the special method include, for example, the lamination method, which is however not so spread among ordinary users at home and therefore it is desired that water fastness of recorded image is improved by improvement of coloring matter, ink composition and the like.

As a coloring matter-skeleton of magenta coloring matters used in water-soluble inks for inkjet recording, typical are xanthene coloring matters and azo coloring matters using H acid (1-amino-8-hydroxy-naphthalene-3,6-disulfonic acid). However, the former is very excellent in hue and vividness but very inferior in light fastness. On the other hand, some of the latter are good in terms of hue but inferior in light fastness, gas fastness and vividness. As for this type, a magenta dye excellent in vividness and light fastness has been developed but it still has a low level in light fastness compared with other dyes having other hues such as a cyan dye represented by a copper phthalocyanine coloring matter and a yellow dye.

Examples of such a magenta coloring matter excellent in vividness and light fastness also include an anthrapyridone coloring matter. Specifically, Patent Literature 1 discloses a mixture containing a sodium salt of formula (1) described later and an ink composition using the mixture. However, the study of the present inventors found that by using said mixture, vividness and light fastness are considerably improved but water fastness is extremely inferior and thus the fastnesses are not satisfying the above requirements. In addition, Patent Literature 2 discloses a structural formula of a trisodium salt of a compound represented by formula (1) described later as "Coloring matter 1" and $^1$H-NMR thereof in heavy water and discloses discoloration or fading tests to an ink using "Coloring matter 1" and to printed samples using said ink, and discloses that images having high fastnesses can be obtained.

With respect to fastnesses, however, there is a study on only color fading by light and there is no description on other various fastnesses as described above. Further, the $^1$H-NMR values, in heavy water, of the trisodium salt described in said Patent Literature 2 is obviously different from $^1$H-NMR values, in heavy water, of the trisodium salt of the compound represented by formula (1) described later which is synthesized by the inventors of the present invention. Furthermore, Patent Literature 2 does not disclose the synthesis method and therefore it cannot be confirmed what said compound is actually like and how much various fastnesses required above are improved.

Patent Literature 1: JP H10-306221 A (pp. 1-17)

Patent Literature 2: JP 2006-124611 A (p. 11)

DISCLOSURE OF THE INVENTION

Problems to Be Solved by the Invention it is an object of the present invention to provide an ink composition containing a magenta coloring matter (compound) which has a hue and vividness suitable for inkjet recording and enables recorded matters excellent in light fastness, moisture fastness, gas fastness and particularly water fastness.

Means of Solving the Problems

The present inventors have intensively studied to solve the above problems and found that an ink composition containing an ammonium salt and/or a sodium salt, particularly a triammonium salt and/or a trisodium salt having certain $^1$H-NMR values described later, of an anthrapyridone compound represented by the following formula (1) can solve the above problems. The present invention has thus been accomplished.

That is, the present invention relates to:

(1) An ammonium salt of a compound represented by the following formula (1),

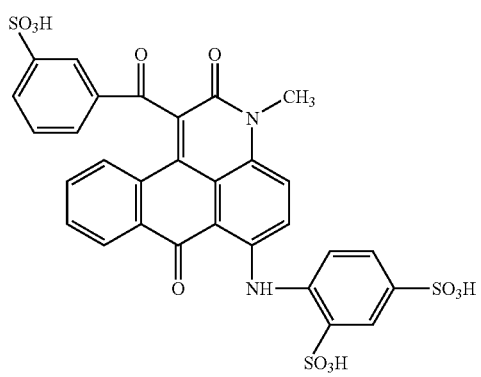

(2) A sodium salt of the compound represented by the formula (1) according to the above (1), (3) An ink composition containing, as a coloring matter, an ammonium salt or a sodium salt of a compound represented by the following formula (1):

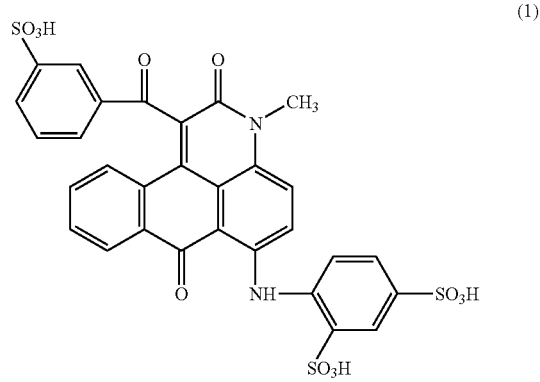

in an area ratio of 85% or more by HPLC relative to the total amount of a coloring matter in the ink composition, (4) The ink composition according to (3), wherein the content of the ammonium salt or the sodium salt according to the above (3) is an area ratio of 95% or more by HPLC, (5) The ink composition according to the above (3) or (4), containing water and a water-soluble organic solvent, (6) The ink composition according to any one of the above (3) to (5), which is for inkjet recording, (7) The ink composition according to any one of the above (3) to (6), wherein the content of inorganic components in the compound according to the above (1) or (2) is 1% by weight or less, (8) The ink composition according to any one of the above (3) to (7), wherein the content of the compound according to the above (1) or (2) is 0.1 to 20% by weight, (9) An inkjet recording method characterized by using the ink composition according to any one of the above (3) to (8) as an ink in an inkjet recording method where recording is conducted on a record-receiving material by discharging ink droplets responding to a recording signal,

(10) The inkjet recording method according to the above (9), wherein the record-receiving material is a communication sheet,

(11) The inkjet recording method according to the above (10), wherein the communication sheet has an ink image receiving layer containing a porous white inorganic substance,

(12) A colored product colored with the ink composition according to the above (11),

(13) The colored product according to the above (12), wherein coloring is performed by a printer,

(14) An inkjet printer loaded with a container containing the ink composition according to the above (13),

(15) An ink composition containing a compound which is a triammonium salt or a trisodium salt of a compound represented by the following formula (1):

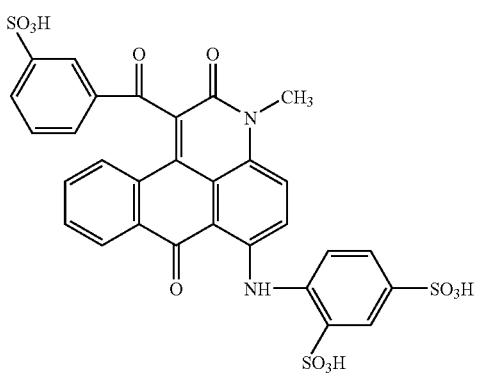

(1)

and which has ¹H-NMR values denoted in the following Table 105 and Table 106:

TABLE 105

| Position Number | Ammonium salt (heavy DMSO) 1H Chemical shift (ppm) | Sodium salt (heavy DMSO) 1H Chemical shift (ppm) |
|---|---|---|
| 1 | 8.21 (1H, m) | 8.23 |
| 2 | 7.89 | 7.89 |
| 3 | 7.50 | 7.49 |
| 4 | 7.89 | 7.89 |
| 5 | 7.81 | 7.83 |
| 6 | 7.63 | 7.62 |
| 7 | 7.71 | 7.72 |
| 8 | 8.46 | 8.49 |
| 9 | 8.00 | 8.01 |
| 10 | 7.76 | 7.78 |
| 11 | 7.42 | 7.42 |
| 12 | 7.58 | 7.58 |
| 13 | 8.14 | 8.15 |
| 14 | 12.12 | 12.14 |
| 15 | 3.76 | 3.78 |
| NH4 | 7.12 | — |

TABLE 106

| Sodium salt (D₂O) 1H Chemical shift (ppm) |
|---|
| 3.72 (3H, s) |
| 12.27 (0.7H, s) |
| 7.42 (1H, m) |
| 7.53 (1H, t) |
| 7.58 (1H, t) |
| 7.66 (1H, d) |
| 7.86-7.90 (2H, m) |
| 7.93-7.96 (3H, m) |
| 8.02 (1H, d) |
| 8.06 (1H, m) |
| 8.24 (1H, d) |
| 8.33 (1H, s) | in an area ratio of 85% or more by HPLC relative to the total amount of a coloring matter in the ink composition (wherein the values denoted in the columns of ammonium salt (heavy DMSO) and sodium salt (D₂O) in Tables are values measured respectively in DMSO-d6 at a sample concentration of 5 mg/700 μL and in heavy water (D₂O) at a sample concentration of 12 mg/700 μL).

Effect of the Invention

The ammonium salt or the sodium salt, particularly the triammonium salt or the trisodium salt having ¹H-NMR values denoted in the above Tables 105 and 106, of the compound of the formula (1) of the present invention has characteristics such as hue exhibiting very high vividness and brightness on inkjet recording paper, excellent water-solubility, and good filtration property to a membrane filter in the production process of ink compositions. In addition, the ink composition of the present invention using this compound is free from crystal precipitation, change in physical properties or in color, or the like after storage for a long period of time, and thus has good storage stability. Further, printed matters using, as a magenta ink for inkjet recording, said ammonium salt or sodium salt, particularly said triammonium salt or trisodium salt having ¹H-NMR values denoted in the above Tables 105 and 106, exhibits ideal magenta hue, not depending on the quality of record-receiving material (paper, film and the like). Furthermore, the magenta ink composition of the present invention enables faithful reproduction of hues of photo-like color images on paper. Moreover, even when recording therewith on record-receiving materials coated with inorganic particulates on the surfaces such as inkjet special paper for photo image quality or films, various good fastnesses such as light fastness, ozone fastness, moisture fastness and particularly water fastness and excellent long-term storage stability of photo-like recorded images can be provided.

BRIEF DESCRIPTION OF THE DRAWINGS

FIG. 27 is a chart of ¹H-NMR obtained by usual measurement (concentration: 12 mg/700 µl, solvent: D₂O, measurement temperature: 24° C.) of the sodium salt of the present invention.

FIG. 28 is an enlarged view of the section of δ7.2-8.6 in FIG. 27.

FIG. 29 shows measured values corresponding to the detected peaks in the chart in FIG. 27.

FIG. 32 shows measured values corresponding to the detected peaks in the chart in FIG. 30.

FIG. 35 shows measured values corresponding to the detected peaks in the chart in FIG. 33.

FIG. 36 is a chart of ¹³C-NMR obtained by usual measurement (concentration: 30 mg/700 µl, solvent: D₂O, measurement temperature: 24° C.) of the sodium salt of the present invention.

FIG. 38 shows measured values corresponding to the detected peaks in the chart in FIG. 36.

DESCRIPTION OF SYMBOLS

Figure 1:
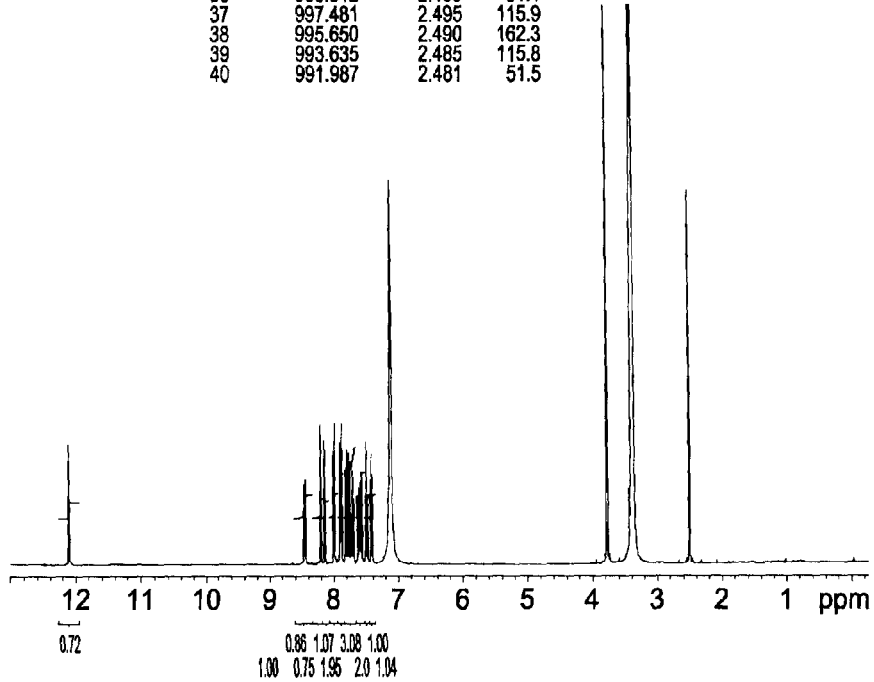
FIG. 1 is a chart of ¹H-NMR obtained by usual measurement (concentration: 15 mg/700 μl, solvent: DMSO-d6, measurement temperature: 24° C.) of the ammonium salt of the present invention.

In the FIGS, the abscissas and the ordinates commonly represent chemical shift values in NMR measurement and the unit is "ppm".

BEST MODE FOR CARRYING OUT THE INVENTION

The present invention will be more specifically described.

The compound of the present invention is an ammonium salt or a sodium salt of a compound represented by the formula (1), particularly a triammonium salt or a trisodium salt having the ¹H-NMR values denoted in the above Tables 105 and 106.

In this connection, hereinafter unless otherwise specified in the present description, the ammonium salt, preferably triammonium salt, of the compound of the above formula (1) of the present invention is referred to as "the ammonium salt of the present invention" and likewise, the sodium salt, preferably trisodium salt, of the compound of the above formula (1) of the present invention is referred to as "the sodium salt of the present invention" and the both are referred to together as "the compound of the present invention" for convenience.

Synthesis method of the sodium salt and the ammonium salt of the present invention will be described.

For the compound of the present invention, a compound of the following formula (2) is an intermediate, which can be sulfonated and then formed into a predetermined salt for synthesis. The intermediate of the following formula (2) can be easily synthesized according to the method described in Patent Literature 1.

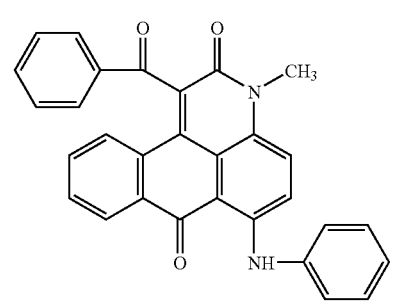

(2)

That is, 1-methylamino-4-anilino anthraquinone, a sodium carbonate and benzoylacetic acid ethyl ester are added to orthodichlorobenzene and heated with stirring until completion of the reaction is determined by HPLC. This heat reaction is carried out while distilling generated ethanol and water out of the reaction system. After completion of the reaction, the reaction solution is water-cooled and methanol is added thereto to precipitate crystals, which are then taken out by filtration, washed with methanol and sequentially with water, and dried to obtain the intended intermediate of the above formula (2).

Using the intermediate of the formula (2) thus obtained above as a material, sulfonation reaction is carried out in a fuming sulfuric acid under heating to obtain the component of the present invention.

The concentration of the fuming sulfuric acid in sulfuric acid is typically 2 to 20% by weight, preferably 5 to 15% by weight and particularly preferably 7 to 15% by weight.

The reaction temperature of the sulfonation is extremely important in order to obtain the compound of the above formula (1). This reaction temperature is typically 60° C. to 120° C., preferably 70° C. to 120° C. and particularly preferably 80° C. to 90° C. The sulfonation reaction is carried out at this temperature to obtain a compound of the above formula (1) having a high purity of 95% or more by HPLC (high performance liquid chromatography) area ratio.

If the reaction temperature of the above sulfonation is too low, sulfonation reaction does not proceed sufficiently. Patent Literature 1 describes that the reaction temperature of sulfonation is typically 0 to 100° C. and preferably 10 to 50° C., and in the examples, sulfonation was carried out in the latter preferable range, i.e., at 10 to 50° C. For that reason, in Patent Literature 1, the sodium salt of the present invention cannot be obtained in high purity and only a mixture of a disulfonic acid compound and a trisulfonic acid compound represented by the following formula (3) is obtained.

In addition, when the reaction temperature is too high, side reaction or decomposition of the raw materials and the products occurs, causing reduction of purity of an intended compound of the formula (1).

The reaction time is typically 15 minutes to 10 hours, preferably 30 minutes to 5 hours and particularly preferably 1 hour to 3 hours. When the sulfonation is carried out in the temperature range of 80 to 120° C., tracking of the reaction proceeding shows that the intermediate of the above formula (2) is consumed at a rate of about 95% or more in 20 minutes and 99% or more in 30 minutes, and further the above formula (2) is not detected in 1 hour and the intended compound of the above formula (1) is detected at a purity of 95% or more. Even when this reaction is further continued for 3 hours, the purity of the intended products is not particularly reduced. In this connection, tracking of the reaction was carried out by TLC (thin layer chromatography) for the first 30 minutes, and then by HPLC for the rest. In addition, purity was determined as an area ratio by HPLC, but the determination was not carried out in the case of tracking of the reaction by TLC.

Salt-forming method of the compound of the above formula (1) will be described.

The reaction liquid of the above sulfonation reaction is poured in ice water and an ammonium chloride is added thereto for salting out to precipitate a solid, which is taken out by filtration to obtain an ammonium salt of the present invention as a wet cake.

When a sodium chloride is used instead of an ammonium chloride, a wet cake of the sodium salt of the present invention can be obtained. When the content of inorganic substances such as sulfate salts which are contained as impurities in the obtained wet cake, for example, ammonium sulfates, is large, the following process can be carried out according to necessity to reduce the content of the impurities. That is, the above wet cake can be dissolved in water or hot water, and further in water-containing organic solvent according to necessity, and an ammonium chloride or a sodium chloride is added thereto for salting out to remove away inorganic substances as impurities. "Water-containing organic solvent" described here means a mixture of a water-miscible organic substance and water. Any organic substance can be used as long as it is miscible with water, and it is typically a water-soluble organic solvent, and examples thereof include, for example, alcohols such as methanol, ethanol and isopropanol.

Other than the above salting out, a method of washing the wet cake with water, hot water or a water-containing organic solvent can remove away the inorganic impurities. For example, the obtained wet cake is pressed mechanically or through the air or the like, sufficiently drained off water and then washed with water, hot water and the like to obtain the same purification effect as that of the above salting out method. Water or the like to be used for washing may contain a salt to be used for salting out, for example, an ammonium chloride and the like. An ammonium salt such as ammonium chloride can be used when an ammonium salt is desired and a sodium salt such as sodium chloride can be used when a sodium salt is desired, respectively corresponding to a desired salt.

The number of salt having been formed in the compound of the present invention is preferably 1 to 3, and particularly preferably all sulfo groups have formed salts, i.e., particularly preferably a triammonium salt or a trisodium salt of a compound of the formula (1).

The compound of the present invention thus obtained above showed a high purity of 95% or more by HPLC (high performance liquid chromatography) area ratio.

Structural analysis of the compound of the present invention will be mentioned.

The mass and the $^1$H- and $^{13}$C-NMR (nuclear magnetic resonance) spectrums of the compound of the present invention were measured and the planar structural formula was determined by means of analysis of the measurement results. In this connection, the measurement of the mass was carried out by means of mass spectrometric analysis by LC-MS. The ammonium salt of the present invention used for the measurement is a triammonium salt and the sodium salt of the present invention likewise is a trisodium salt.

In this connection, the position numbers described in the following formula (101) will be used hereinafter for convenience of data analysis.

For convenience, the formula (101):

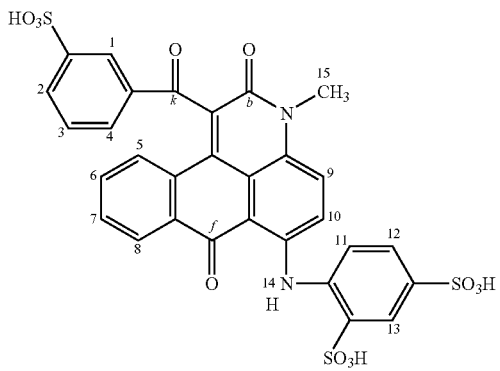

is described in the form that salt is abbreviated.

In the formula (101), the 14-position indicates the position number of nitrogen atom and the 1- to 15-positions except the 14-position indicate position numbers of carbon atoms, but in the $^1$H-NMR analysis, they are used as a position number of a hydrogen atom bonded to nitrogen atom or a carbon atom for convenience unless otherwise specified. Each of b, f and k represents a position number of carbonyl carbon atom.

In addition, the chemical shift unit is ppm and represented as δ "numerical value". For example, the notation "δ 3.00" means that the peak chemical shift is 3.00 ppm. In this connection, "numerical values" are indicated by figures down to the second decimal place in principle except for the case of particular necessity. However, when a range of numerical values is indicated along an axis in the description of the drawings, the values are indicated by figures down to the first decimal place for convenience. In addition, when values indicated by figures down to the second decimal place are the same, they are indicated by figures down to the third decimal place according to necessity for distinguishing them.

The chemical shift is a value based on TMS (tetramethylsilane) and TSP (3-sodium trimethylsilylpropionate) used as IS (internal standard material) in principle. The former is used as IS for NMR measurement using an organic solvent and the latter is used as IS for NMR measurement using heavy water, respectively.

By the way, it is clear to the skilled person in the art that even when NMR measurement is conducted using a high resolution NMR measuring apparatus under the same conditions including a measuring equipment, it is often the case that the chemical shift values as the measurement result are not completely-consistent if all of the figures after the decimal point are taken into account, for example, because of, effect of mass error of weighed samples and impurities such as water contained in a deuterated solvent used in measurement, and the like.

Therefore, as for the chemical shift values described in the present description, when a numerical value is rounded to the first decimal place, inaccuracy in the range of ±0.1 ppm in the number in the first decimal place thereof is acceptable. For a specific example, when a measured value is 3.764 ppm, the numerical value obtained after the measured value is rounded off to the first place is 3.8 ppm, which is in the range of inaccuracy of 3.8±0.1 ppm, i.e., 3.7 ppm to 3.9 ppm and therefore in the acceptable range.

By usual measurement of $^1$H-NMR together with measurement of two dimensional COSY, HOHAHA and NOESY spectrums, each binding position of the hydrogen atom was analyzed from each spectrum chart obtained.

By usual measurement of $^{13}$C-NMR together with measurement of DEPT (90° pulse) and two dimensional HSQC and HMBC spectrums, each binding position of carbon atom and carbon atom-hydrogen atom was analyzed from each spectrum chart obtained.

Each measurement was conducted at 24° C. in that the concentration of the ammonium salt of the present invention is 15 mg/700 ηl.

The measuring equipment is UNITY INOVA 400 which is a trade name and manufactured by Varian Inc.

The measurement solvent is DMSO-d6 (dimethylsulfoxide-d6).

In this connection, as for $^{13}$C-NMR, the central peak of the heavy DMSO was detected and defined as δ 39.4599, which was the measurement standard of the chemical shift.

FIG. 1 to FIG. 26 which will be explained below are NMR measurement charts of the ammonium salt of the present invention.

FIG. 1 is a chart of $^1$H-NMR obtained by usual measurement (concentration: 15 mg/700 μl, solvent: DMSO-d6, measurement temperature: 24° C.) of the ammonium salt of the present invention.

Figure 2:
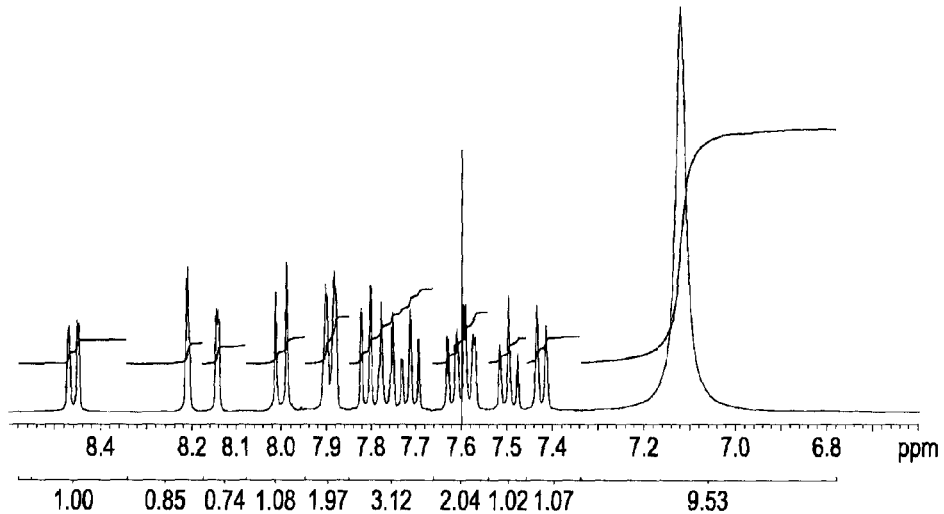
FIG. 2 is an enlarged view of the section of δ6.7-8.5 in FIG. 1.

FIG. 2 is an enlarged view of the section of δ6.7-8.5 in FIG. 1.

Figure 3:
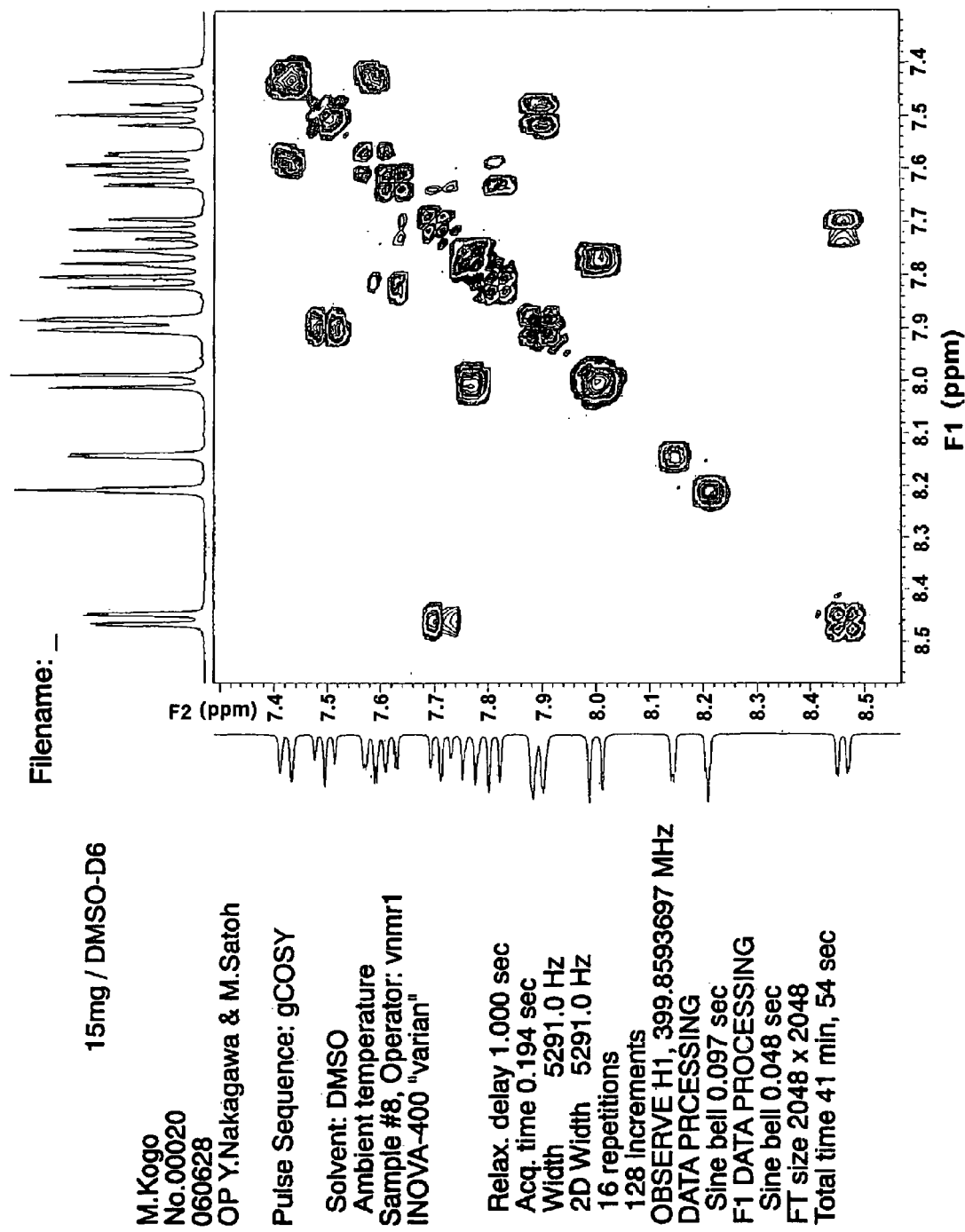
FIG. 3 is a chart obtained by COSY measurement of the section of δ7.3-8.6 in FIG. 1. It shows the results from integration carried out 16 times.

FIG. 3 is a chart obtained by COSY measurement of the section of δ7.3-8.6 in FIG. 1 It is the results from integration carried out 16 times.

Figure 4:
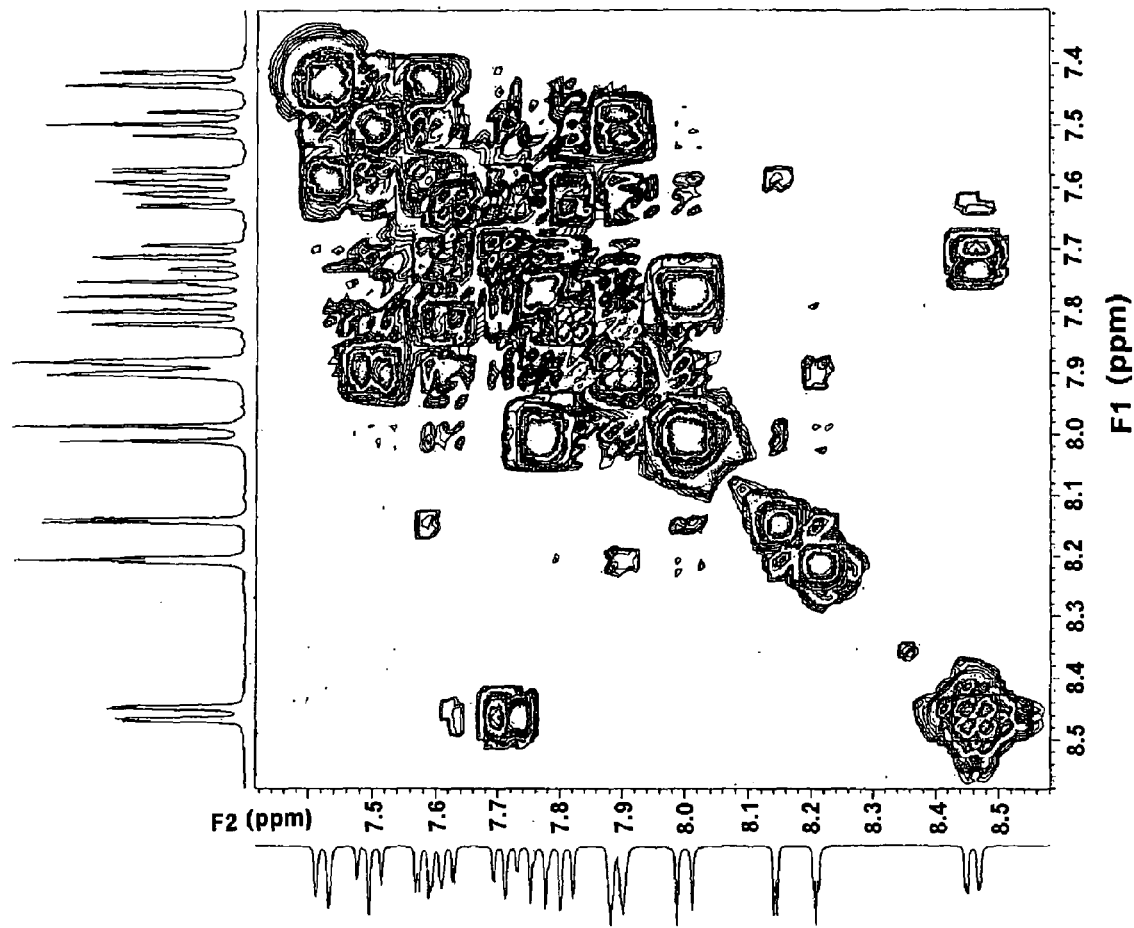
FIG. 4 is a chart obtained by COSY measurement of the section of δ7.3-8.6 in FIG. 1. It shows the results from integration in FIG. 3 carried out 64 times.

FIG. 4 is a chart obtained by COSY measurement of the section of δ7.3-8.6 in FIG. 1. It is the results from integration in FIG. 3 carried out 64 times.

Figure 5:
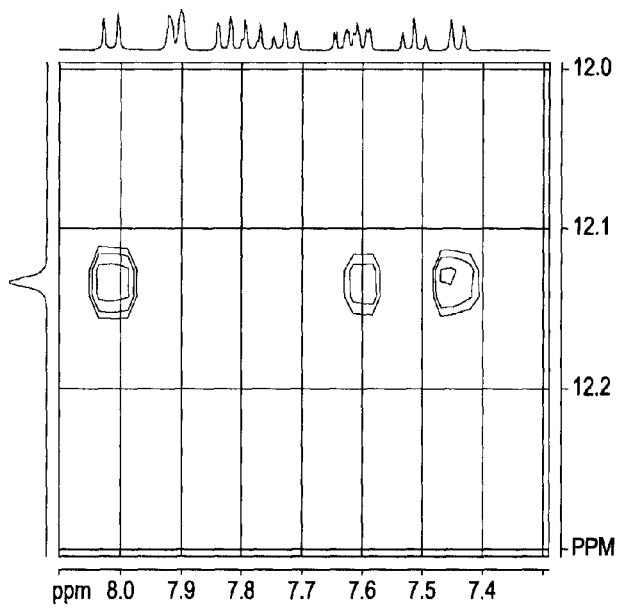
FIG. 5 is a chart obtained by COSY measurement of the section of the abscissa δ7.3-8.1 and the ordinate δ12.0-12.3 in FIG. 1.

FIG. 5 is a chart obtained by COSY measurement of the section of the abscissa δ7.3-8.1 and the ordinate δ12.0-12.3 in FIG. 1.

Figure 6:
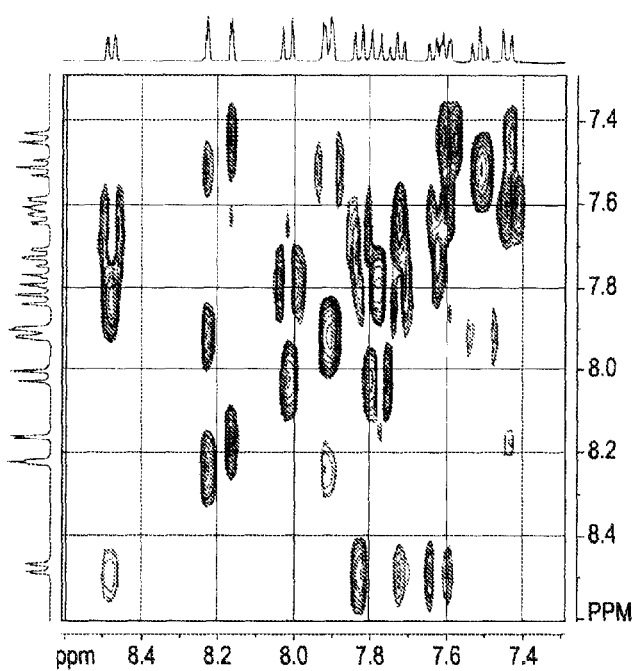
FIG. 6 is a chart obtained by HOHAHA measurement of the section of δ7.3-8.6 in FIG. 1.

FIG. 6 is a chart obtained by HOHAHA measurement of the section of δ7.3-8.6 in FIG. 1.

Figure 7:
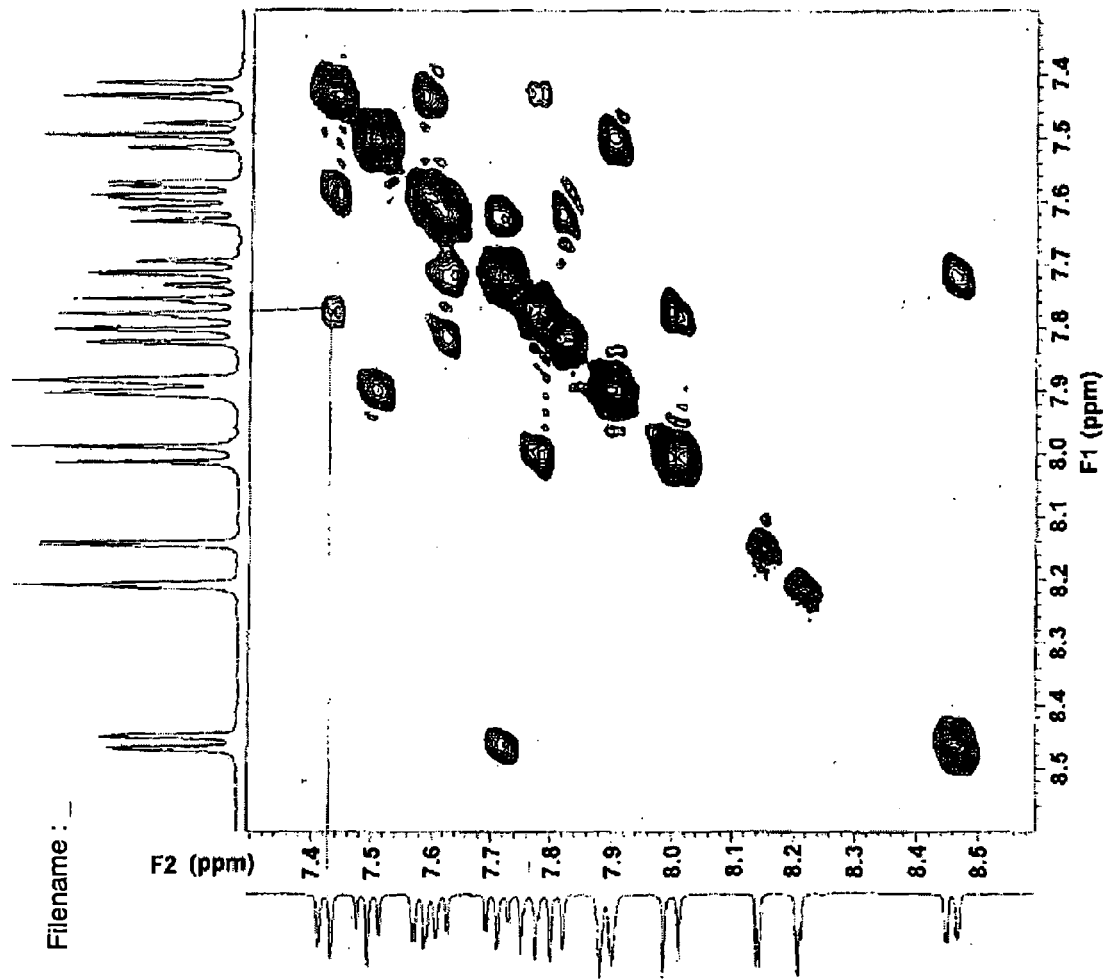
FIG. 7 is a chart obtained by NOESY measurement of the section of δ7.3-8.6 in FIG. 1.

FIG. 7 is a chart obtained by NOESY measurement of the section of δ7.3-8.6 in FIG. 1.

Figure 8:
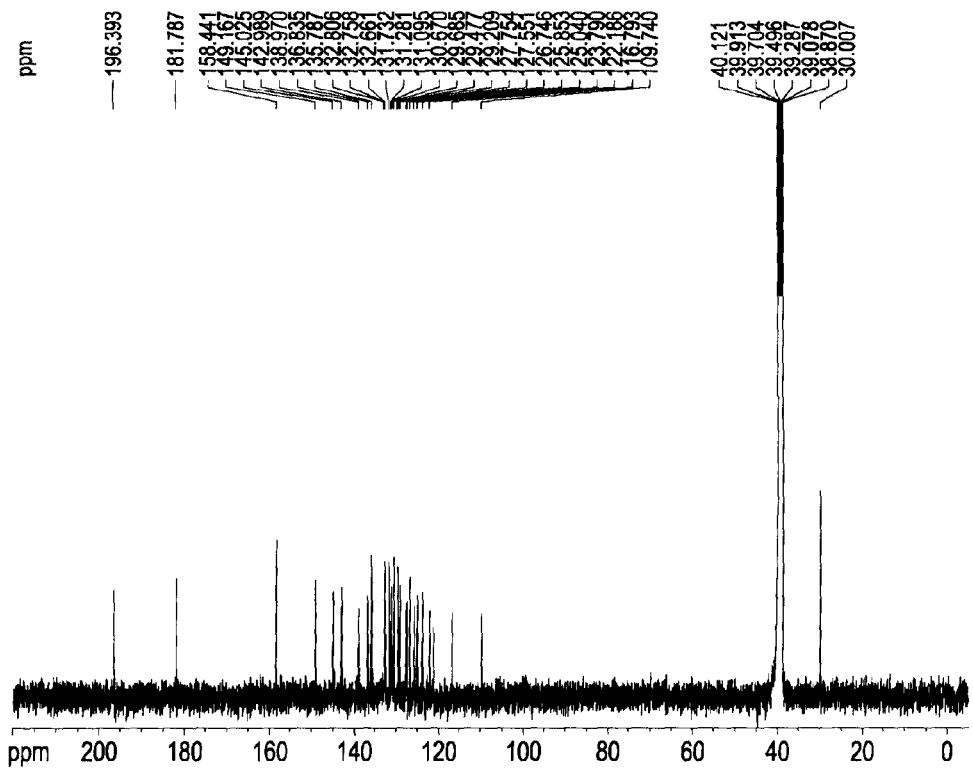
FIG. 8 is a chart of ¹³C-NMR obtained by usual measurement (concentration: 15 mg/700 μl, solvent: DMSO-d6, measurement temperature: 24° C.) of the ammonium salt of the present invention.

FIG. 8 is a chart of $^{13}$C-NMR obtained by usual measurement (concentration: 15 mg/700 μl, solvent: DMSO-d6, measurement temperature: 24° C.) of the ammonium salt of the present invention.

Figure 9:
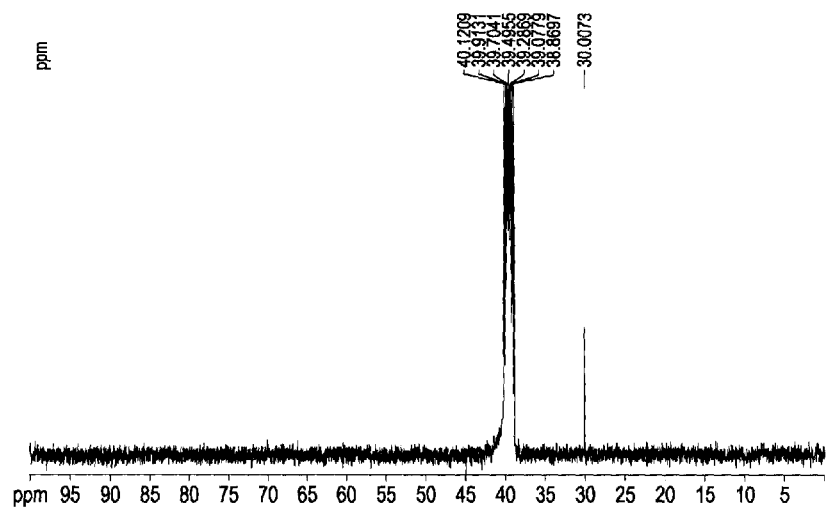
FIG. 9 is an enlarged view of the section of δ0.0-100.0 in FIG. 8.

FIG. 9 is an enlarged view of the section of δ0.0-100.0 in FIG. 8.

Figure 10:
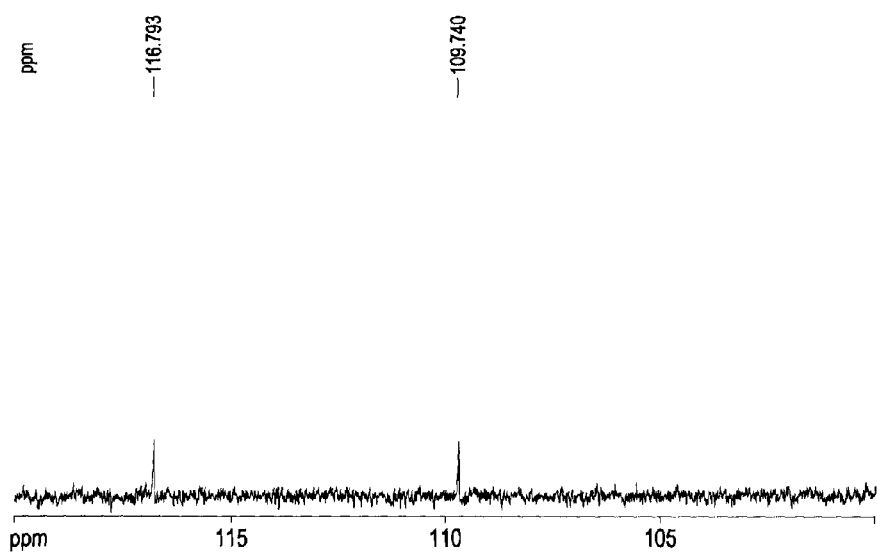
FIG. 10 is an enlarged view of the section of δ100.0-120.0 in FIG. 8.

FIG. 10 is an enlarged view of the section of δ100.0-120.0 in FIG. 8.

Figure 11:
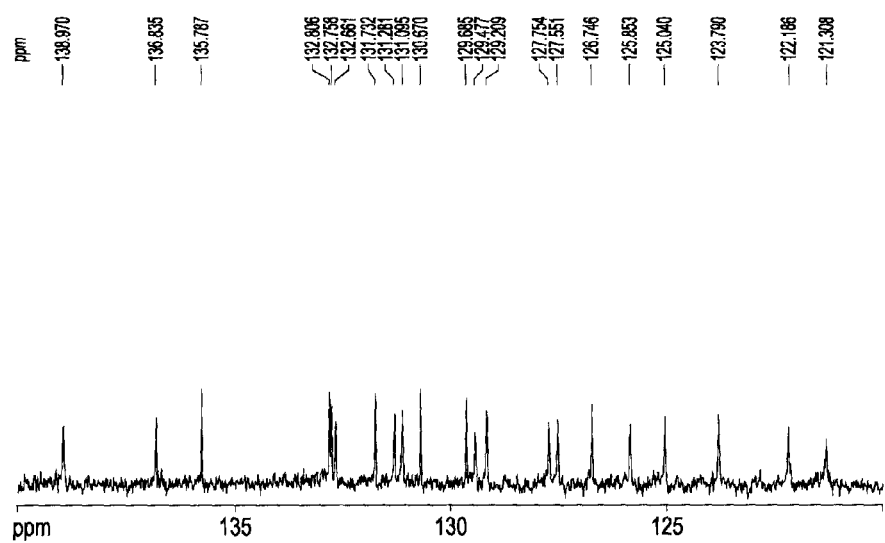
FIG. 11 is an enlarged view of the section of δ120.0-140.0 in FIG. 8.

FIG. 11 is an enlarged view of the section of δ120.0-140.0 in FIG. 8.

Figure 12:
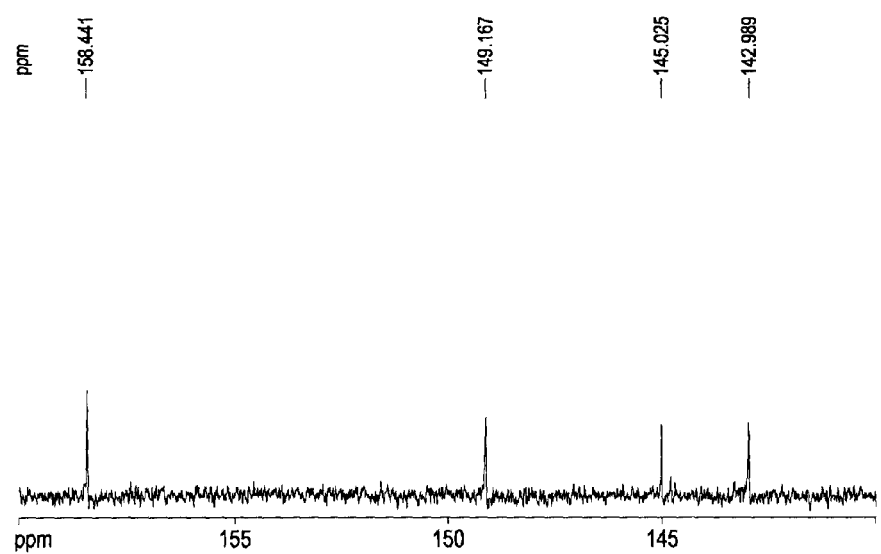
FIG. 12 is an enlarged view of the section of δ140.0-160.0 in FIG. 8.

FIG. 12 is an enlarged view of the section of δ140.0-160.0 in FIG. 8.

Figure 13:
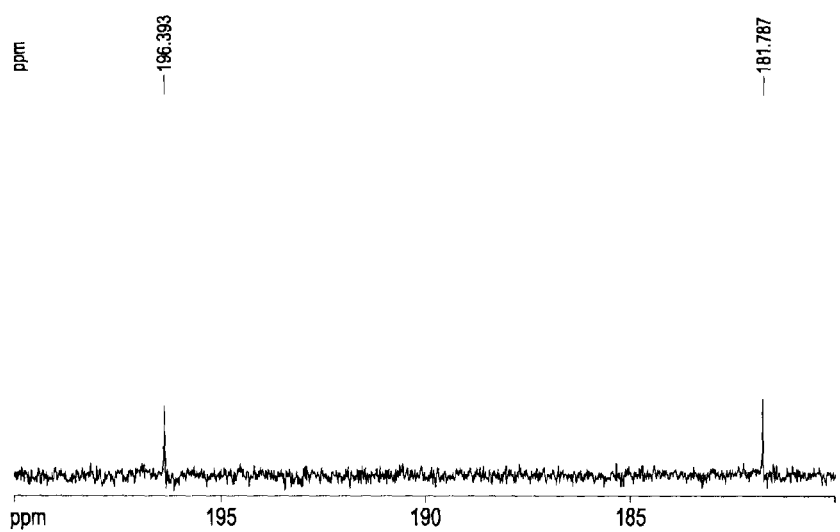
FIG. 13 is an enlarged view of the section of δ180.0-200.0 in FIG. 8.

FIG. 13 is an enlarged view of the section of δ180.0-200.0 in FIG. 8.

Figure 14:
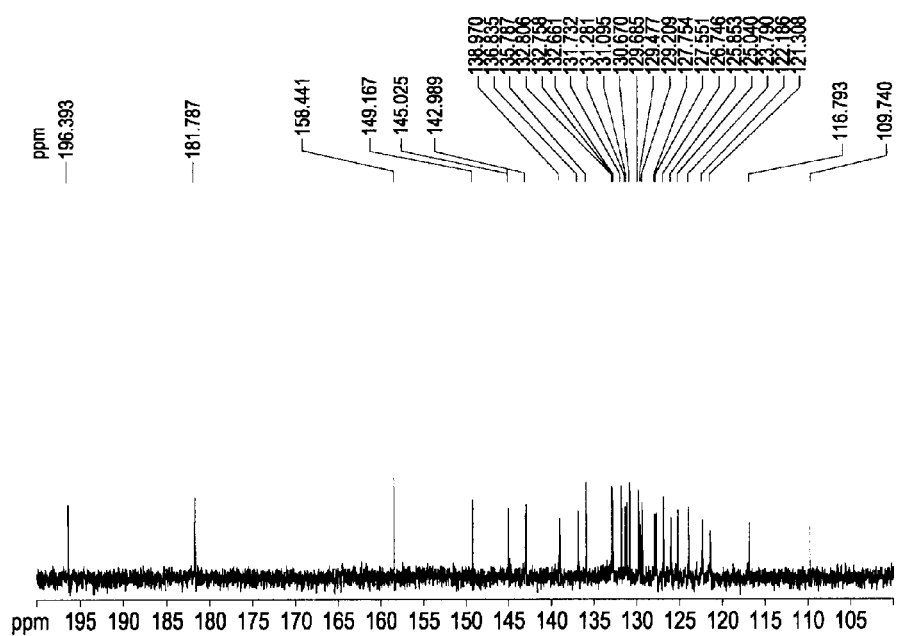
FIG. 14 is an enlarged view of the section of δ100.0-200.0 in FIG. 8.

FIG. 14 is an enlarged view of the section of δ100.0-200.0 in FIG. 8.

Figure 15:
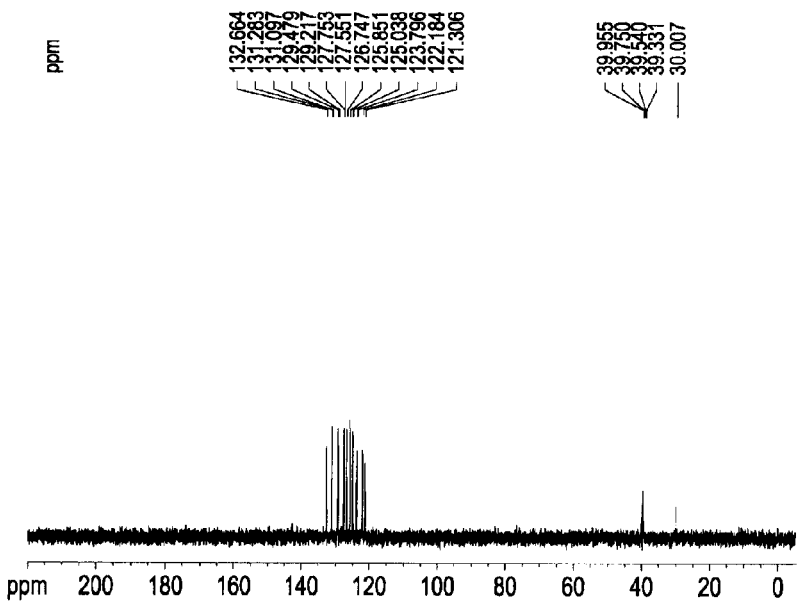
FIG. 15 is a chart obtained by DEPT measurement.

FIG. 15 is a chart obtained by DEPT measurement.

Figure 16:
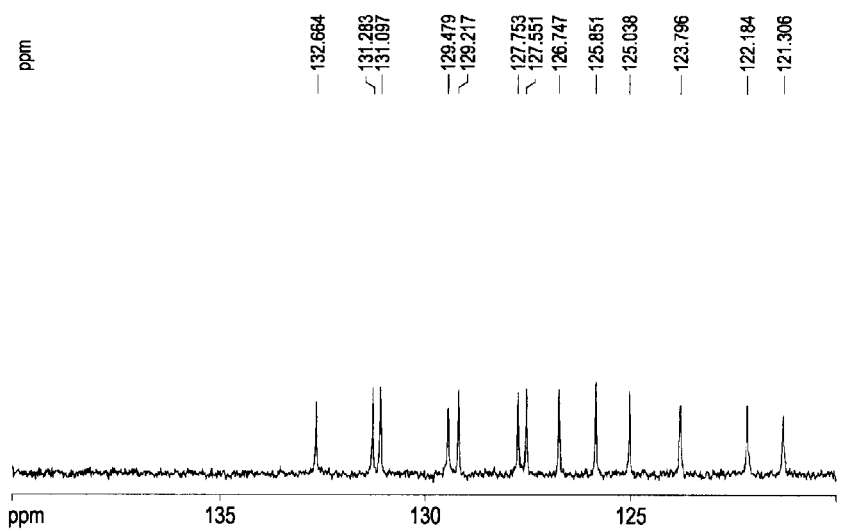
FIG. 16 is an enlarged view of the section of δ120.0-140.0 in FIG. 15.

FIG. 16 is an enlarged view of the section of δ120.0-140.0 in FIG. 15.

Figure 17:
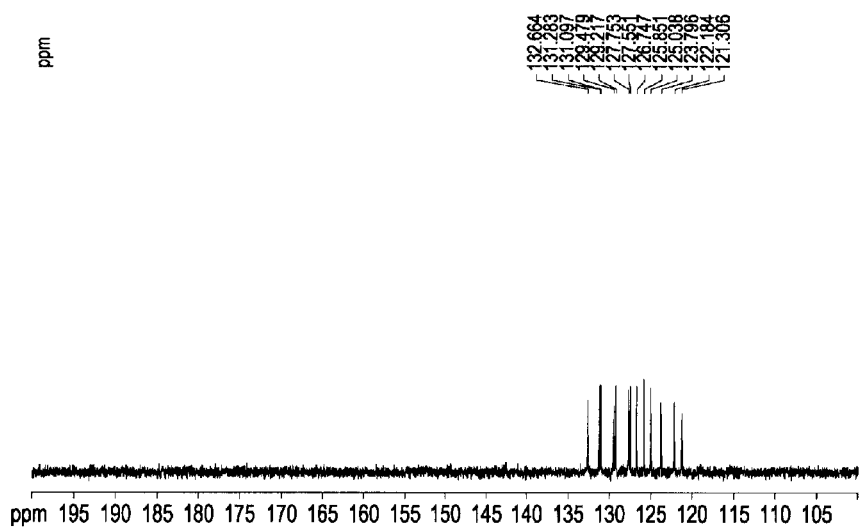
FIG. 17 is an enlarged view of the section of δ100.0-200.0 in FIG. 15.

FIG. 17 is an enlarged view of the section of δ100.0-200.0 in FIG. 15.

Figure 18:
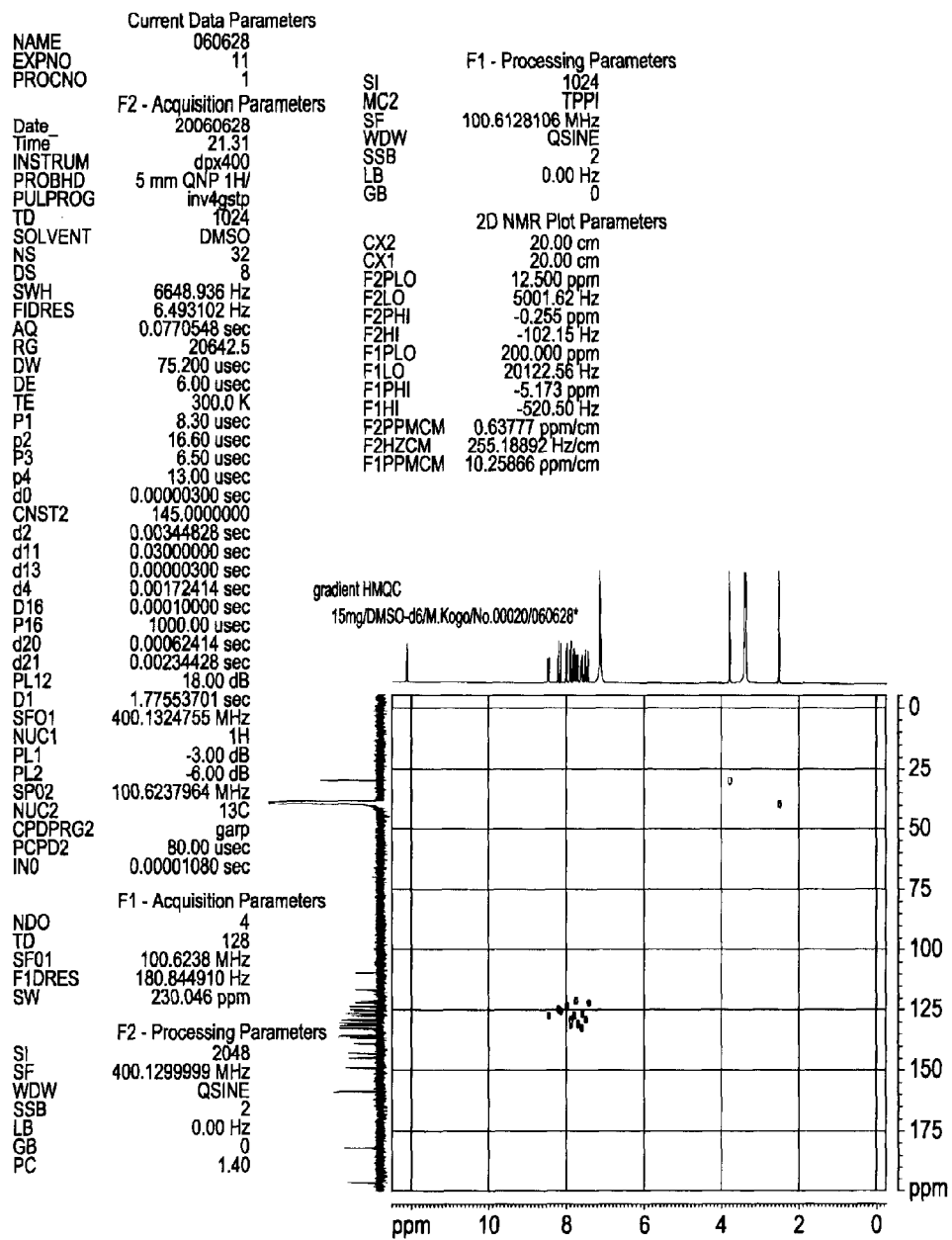
FIG. 18 is a chart obtained by HMQC measurement, in which the abscissa is ¹H-NMR (δ-0.2 to 12.5) and the ordinate is ¹³C-NMR (δ-5.0 to 200.0).

FIG. 18 is a chart obtained by HMQC measurement, in which the abscissa is $^1$H-NMR (δ-0.2 to 12.5) and the ordinate is $^{13}$C-NMR (δ-5.0 to 200.0).

Figure 19:
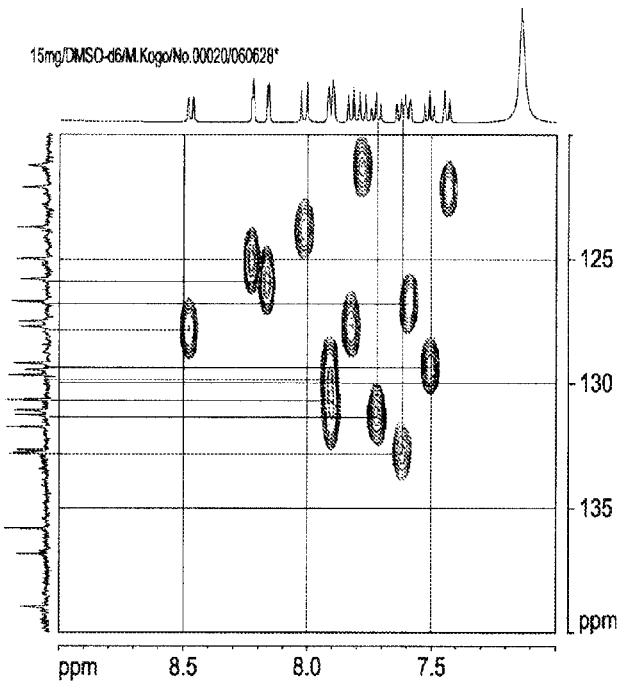
FIG. 19 is an enlarged view of the section of the abscissa δ7.0-9.0 and the ordinate δ120.0-140.0 in FIG. 18.

FIG. 19 is an enlarged view of the section of the abscissa is δ7.0-9.0 and the ordinate is δ120.0-140.0 in FIG. 18.

Figure 20:
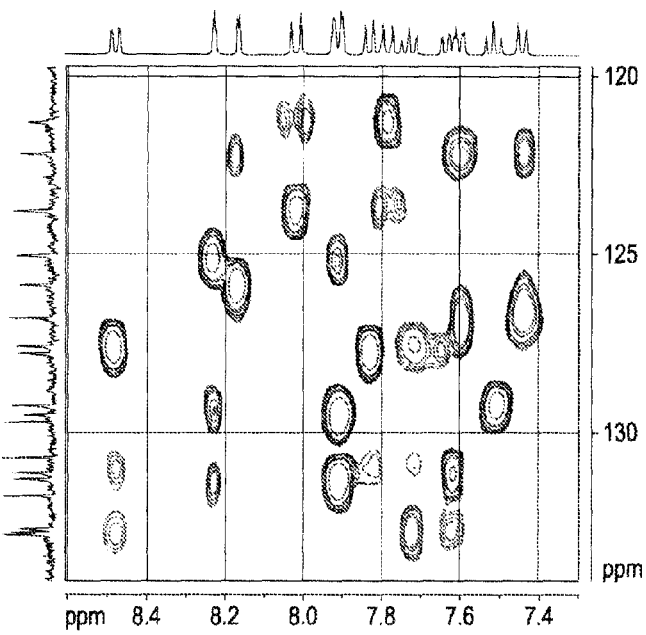
FIG. 20 is a chart obtained by HSQC-HOHAHA measurement, in which the abscissa is ¹H-NMR (δ7.3-8.6) and the ordinate is ¹³C-NMR (δ120.0-135.0).

FIG. 20 is a chart obtained by HSQC-HOHAHA measurement, in which the abscissa is $^1$H-NMR (δ7.3-8.6) and the ordinate is $^{13}$C-NMR (δ120.0-135.0).

Figure 21:
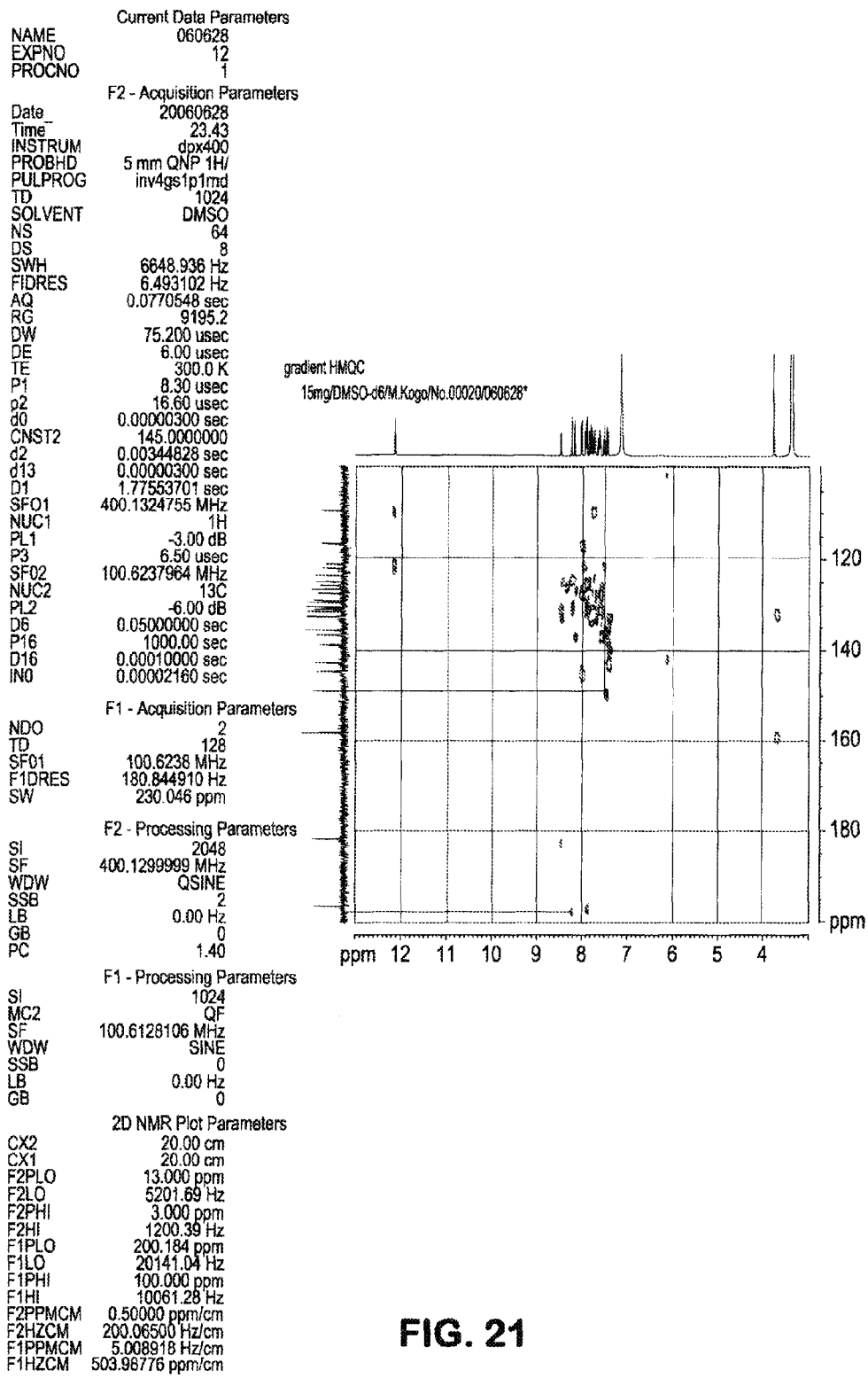
FIG. 21 is a chart obtained by HMBC measurement, in which the abscissa is ¹H-NMR (δ3.0-13.0) and the ordinate is ¹³C-NMR (δ100.0-200.0).

FIG. 21 is a chart obtained by HMBC measurement, in which the abscissa is $^1$H-NMR (δ3.0-13.0) and the ordinate is $^{13}$C-NMR (δ100.0-200.0).

Figure 22:
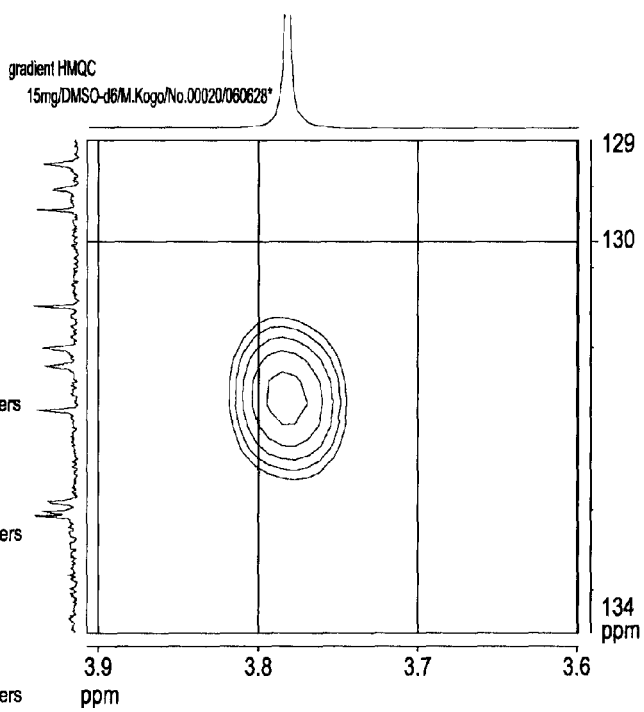
FIG. 22 is an enlarged view of the section of the abscissa δ3.6-3.9 and the ordinate δ129.0-134.0 in FIG. 21.

FIG. 22 is an enlarged view of the section of the abscissa δ3.6-3.9 and the ordinate δ129.0-134.0 in FIG. 21.

Figure 23:
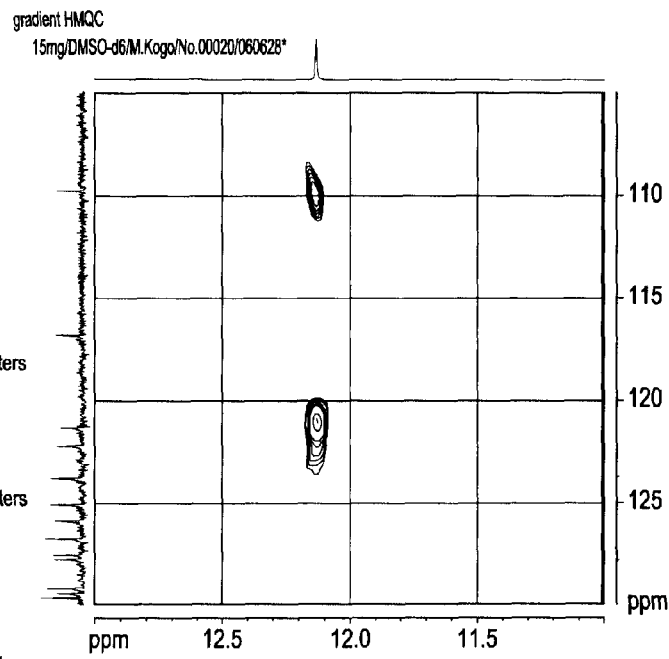
FIG. 23 is an enlarged view of the section of the abscissa δ11.0-13.0 and the ordinate δ105.0-130.0 in FIG. 21.

FIG. 23 is an enlarged view of the section of the abscissa δ11.0-13.0 and the ordinate δ105.0-130.0 in FIG. 21.

Figure 24:
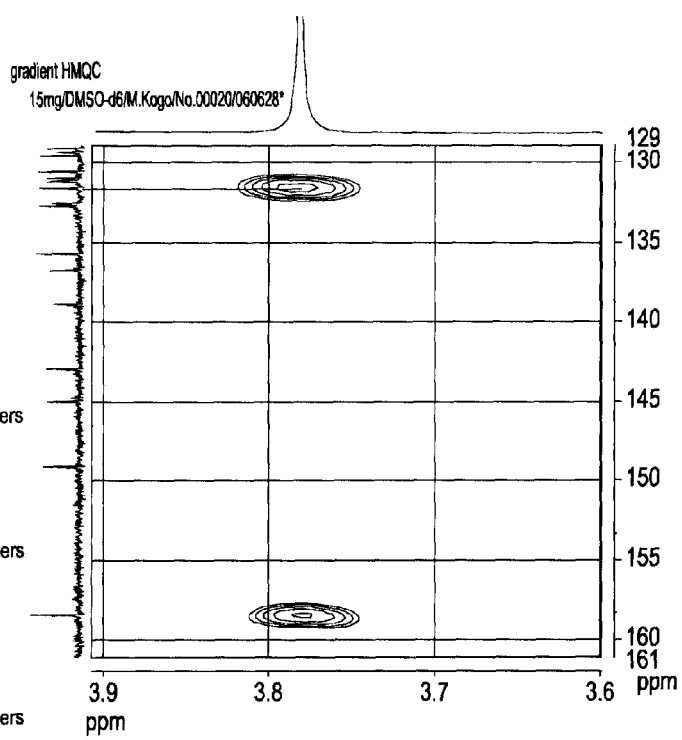
FIG. 24 is an enlarged view of the section of the abscissa δ3.6-3.9 and the ordinate δ129.0-161.0 in FIG. 21.

FIG. 24 is an enlarged view of the section of the abscissa δ3.6-3.9 and the ordinate δ129.0-161.0 in FIG. 21.

Figure 25:
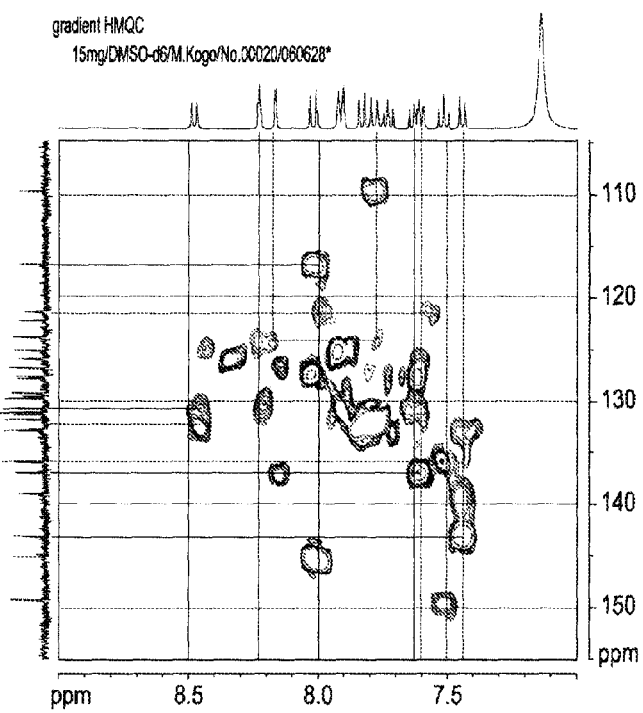
FIG. 25 is an enlarged view of the section of the abscissa δ7.0-9.0 and the ordinate δ105.0-155.0 in FIG. 21.

FIG. 25 is an enlarged view of the section of the abscissa δ7.0-9.0 and the ordinate δ105.0-155.0 in FIG. 21.

Figure 26:
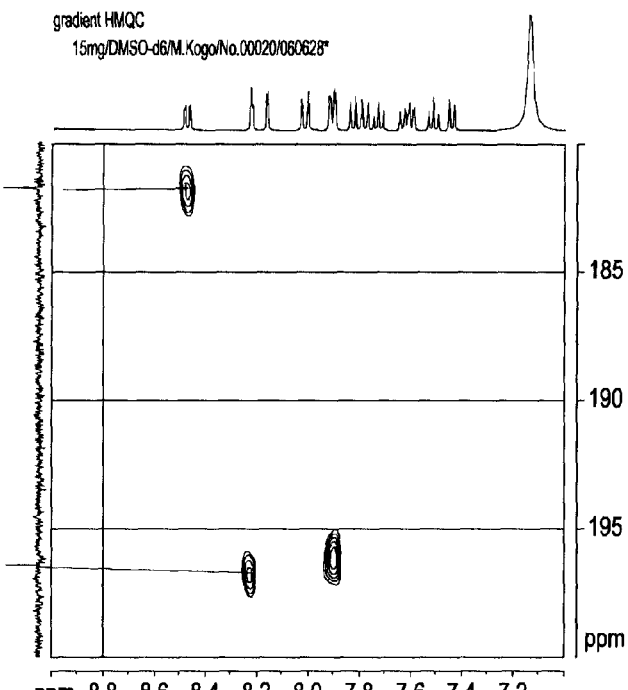
FIG. 26 is an enlarged view of the section of the abscissa δ7.0-9.0 and the ordinate δ180.0-200.0 in FIG. 21.

FIG. 26 is an enlarged view of the section of the abscissa δ7.0-9.0 and the ordinate δ180.0-200.0 in FIG. 21.

The following Table 101 is a synoptical table for the correlation from the analysis results of DEPT, HMBC and HMQC spectrums among the above measurement results.

TABLE 101

| | | Correlation of DEPT, HMBC and HMQC | | | | | | | | | | | | | | |
|---|---|---|---|---|---|---|---|---|---|---|---|---|---|---|---|---|
| Position number | δ | 12.12 (14) | 8.46 (8) | 8.21 (1) | 8.14 (13) | 8.0 (9) | 7.89 (2, 4) | 7.81 (5) | 7.76 (10) | 7.71 (7) | 7.63 (6) | 7.58 (12) | 7.5 (3) | 7.42 (11) | 7.11 (NH4) | 3.76 (15) |
| 15 | 30.01 | | | | | | | | | | | | | | | |
| | 109.74 | B | | | | | B | | | | | | | | | |
| | 116.79 | | | | | B | | | | | | | | | | |

TABLE 101-continued

Correlation of DEPT, HMBC and HMQC

| Position number | δ | 12.12 (14) | 8.46 (8) | 8.21 (1) | 8.14 (13) | 8.0 (9) | 7.89 (2, 4) | 7.81 (5) | 7.76 (10) | 7.71 (7) | 7.63 (6) | 7.58 (12) | 7.5 (3) | 7.42 (11) | 7.11 (NH4) | 3.76 (15) |
|---|---|---|---|---|---|---|---|---|---|---|---|---|---|---|---|---|
| 10 | 121.31 | B | | | | | | | S | | | | | | | |
| 11 | 122.19 | | | | | | | | | | | | | S | | |
| 9 | 123.79 | | | | | S | | | | | | | | | | |
| 1 | 125.04 | | | S | | | | | | | | | | | | |
| 13 | 125.85 | | | | S | | | | | | | | | | | |
| 12 | 126.75 | | | | | | | | | | | S | | | | |
| 5 | 127.55 | | | | | | | S | | | | | | | | |
| 8 | 127.75 | | S | | | | | | | | | | | | | |
| 3 | 129.21 | | | | | | | | | | | | S | | | |
| 2 or 4 | 129.48 | | | | | | S | | | | | | | | | |
|  | 129.69 | | | | | | | | | | | | | | | |
|  | 130.67 | | B | | | | | | | | | | | | | |
| 7 | 131.10 | | | | | | | | | S | | | | | | |
| 4 or 2 | 131.28 | | | | | | S | | | | | | | | | |
| e | 131.73 | | B | | e | | | | | | | | | | B | |
| 6 | 132.66 | | | | | | | | | | S | | | | | |
|  | 132.76 | | | | | | | | | | | | | | | |
|  | 132.81 | | | | | | | | | | | | | | | |
|  | 135.79 | | | | | | | | | | | B | | | | |
|  | 136.84 | | | B | | | | | | | | | | | | |
|  | 138.97 | | | | | | | | | | | | | B | | |
|  | 142.99 | | | | | | | | | | | | | B | | |
|  | 145.03 | | | | B | | | | | | | | | | | |
|  | 149.17 | | | | | | | | | | | B | | | | |
| b | 158.44 | | | | | | | | | | | | | | B | |
| f | 181.79 | B | | | | | | | | | | | | | | |
| k | 196.39 | | | B | | B | | | | | | | | | | | e: Regarded as e, but not confirmed.
Boldface: C having H (DEPT)
B: HMBC cross peak
S: HMQC cross peak By analysis of the above measurement results, the ammonium salt of the present invention was determined to be an ammonium salt of a compound having a chemical structural formula of the above formula (101). Attribution of the hydrogen atoms and the carbon atoms leading to the determination is as follows. From FIG. 1, it was determined that the peak δ3.76 was attributed to the hydrogen atom of the 15-position.

From FIG. 3 and FIG. 4, it was determined that the peak δ7.42 was attributed to a hydrogen atom of the 11-position; δ7.58 is likewise of the 12-position; δ8.14 was likewise of the 13-position; δ8.21 was likewise of the 1-position; δ7.89 was likewise of the 2-position; δ7.50 was likewise of the 3-position; and δ7.89 was likewise of the 4-position, respectively. However, the peaks of the 2-position and the 4-position are overlapped each other and thus their chemical shifts have the same value.

In addition, it was found from FIG. 3 that δ7.76 or 8.00 is corresponded to the 9-position or the 10-position. Further, it could be observed from FIG. 7 that the peak across the 11-position hydrogen atom was δ7.76, and therefore it was determined that this peak was attributed to the 10-position and δ8.00 was likewise to the 9-position.

Further, it was found from FIG. 3 that δ7.81, 7.63, 7.71 and 8.46 were hydrogen atoms in a row (which are bonded to a carbon atom) and corresponded to either the 5-position to the 8-position or the 8-position to the 5-position. Furthermore, each of them can be attributed to the carbon atoms b, k and f respectively for the reason described below from Table 101, and therefore it was determined that δ8.46 which is across that of the carbon atom f of δ181.79 was attributed to the 8-position and the above four peaks were respectively attributed to the hydrogen atoms at the 5-position to the 8-position in a row.

Furthermore, attribution of the carbon atoms b, k and f was determined as follows. In $^{13}$C-NMR, these peaks were observed as three peaks in δ158.44, 196.39 and 181.79 which were the area of carbonyl carbon atoms. From Table 101, it was determined that the peak δ158.44 across the 15-position hydrogen atom was attributed to b and δ196.39 across the 1-position and the 4-position (whose peaks are overlapped with that of the 2-position) hydrogen atoms was likewise to k. Accordingly, it was determined that the third peak, i.e., δ181.79 was attributed to f.

Moreover, it was determined from FIG. 5 that the peak δ12.12 is across each the 11-position, 12-position and 9-position hydrogen atoms and therefore this peak was attributed to the hydrogen atom of the 14-position.

Lastly, it was determined that the peak δ7.12 was attributed to the hydrogen atom of the ammonia molecule forming a salt with the compound of the formula (101).

The ammonium salt of the present invention can have a resonance structure and therefore the carbonyl group involved in the carbon atom f can be possibly an enol-type tautomer. In this case, the nitrogen atom at the 14-position is involved in resonance and therefore a hydrogen atom is not bonded at the 14-position. However, it was confirmed that a hydrogen atom is present at the 14-position due to the above attribution and therefore the carbonyl group is, under the present measurement conditions, present not as an enol-type tautomer but as a keto-type tautomer shown in the above formula (101).

From the results mentioned above, the ammonium salt of the present invention was structure-determined to be an ammonium salt of the compound represented by the above formula (101).

Structural analysis of the sodium salt of the present invention will be described.

The sodium salt of the present invention was dissolved in DMSO-d6 at a concentration of 5 mg/700 μl to conduct $^1$H-NMR measurement. The sample used is a trisodium salt.

$^1$H-NMR spectrum of the trisodium salt of the present invention was nearly conformed to that of the triammonium salt of the present invention, whereby such a detailed analysis as conducted on the ammonium salt is not conducted and the both data are just denoted in the following Table 102.

In addition, only from the measurement data at this time, attribution of the carbon atoms not bonded with a hydrogen atom is not determined. For this reason, only the carbon atoms whose attribution could be determined are described in Table 102.

TABLE 102

| Position Number | The ammonium salt of the present invention | | The sodium salt of the present invention |
|---|---|---|---|
| | 1H Chemical shift (ppm) | 13C Chemical shift (ppm) | 1H Chemical shift (ppm) |
| 1 | 8.21 (1H, m) | 125.04 | 8.23 |
| 2 | 7.89 | 129.48 or 131.28 | 7.89 |
| 3 | 7.50 | 129.21 | 7.49 |
| 4 | 7.89 | 131.28 or 129.48 | 7.89 |
| 5 | 7.81 | 127.55 | 7.83 |
| 6 | 7.63 | 132.66 | 7.62 |
| 7 | 7.71 | 131.10 | 7.72 |
| 8 | 8.46 | 127.75 | 8.49 |
| 9 | 8.00 | 123.79 | 8.01 |
| 10 | 7.76 | 121.31 | 7.78 |
| 11 | 7.42 | 122.19 | 7.42 |
| 12 | 7.58 | 126.75 | 7.58 |
| 13 | 8.14 | 125.85 | 8.15 |
| 14 | 12.12 | — | 12.14 |
| 15 | 3.76 | 30.01 | 3.78 |
| NH4 | 7.12 | — | — |
| b | — | 158.44 | — |
| f | — | 181.79 | — |
| k | — | 196.39 | — |

Patent Literatures 1 and 2 disclose the chemical structural formulas as sodium salts of compounds having the chemical structural formula of the formula (1)

That is, Table 1 of Patent Literature 1 discloses the chemical structural formula as Compound No. 36. However, Example 7 as the synthesis example describes that the obtained compound is composed of 9.1 parts of Compound No. 36 and 3.2 parts of Compound No. 26 and it is found that the compound is just obtained as a mixture with a compound of the following formula (3) actually having no substituent on the benzoyl group (see Compound No. 26 in Table 1 of Patent Literature 1).

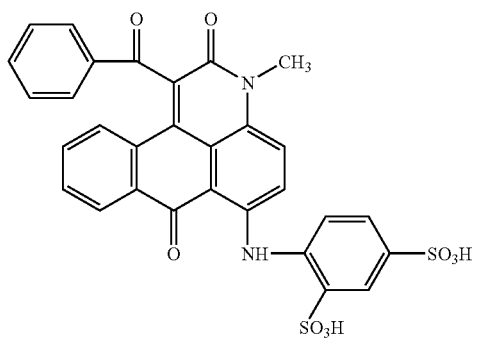

(3)

In addition, Patent Literature 1 specifically discloses, in Examples 10 and 11, preparation of an ink and evaluation of the ink from a mixture of a compound where sulfobenzoyl of a compound of the formula (1) is changed to an ethoxycarbonyl and a carboxy group, but discloses no specific ink using a mixture of Compound No. 36 and Compound No. 26 obtained in the above Example 7 and describes no colored matter obtained by using said mixture, no evaluation of the ink, nor the like.

As described later, the present inventors actually synthesized the mixture of Compound No. 36 and Compound No. 26 described in Patent Literature 1, prepared inks using this mixture and evaluated these inks, resulting in that the mixture described in Patent Literature 1 has an extremely inferior water fastness and thus has a problem.

Patent Literature 2 describes a chemical structural formula of a trisodium salt of a compound of the above formula (1) as "Coloring matter 1", and also describes data of $^1$H- and $^{13}$C-NMR spectrums in heavy water. However, as described below, the data of $^1$H-NMR spectrum in heavy water described in said Patent Literature 2 is obviously different from the data of $^1$H- and $^{13}$C-NMR spectrum in heavy water of the trisodium salt of the compound represented by the formula (1) which is synthesized in the present invention, confirming that "Coloring matter 1" described in Patent Literature 2 is different from the trisodium salt of the formula (1) compound synthesized in the present invention and structure-determined as described above.

Hereinafter, "Coloring matter 1" described in Patent Literature 2 is simply referred to as "Coloring matter 1" for convenience.

In addition, the synthesis method of said "Coloring matter 1" is, as mentioned above, not specifically disclosed, and therefore it was not confirmed what the synthesized compound described in Patent Literature 2 is actually like.

Comparison of $^1$H- and $^{13}$C-NMR spectrum values, in heavy water, of a trisodium salt of a compound represented by the formula (1) which is synthesized according to the present invention with the data of "Coloring matter 1" described in Patent Literature 2 will be described below.

Structure determination of the compound of the present invention was carried out as mentioned above and therefore the measurement in heavy water is not analyzed and the data is just shown.

In this connection, when a position number is described, the position number is assumed from comparison with the results determined by using heavy DMSO. In this case, the position numbers described in the above formula (101) are continuously used.

The following FIG. 27 to FIG. 38 are NMR measurement charts of the sodium salt of the present invention in heavy water. They will be simply explained below. In this connection, description in the parentheses shows measurement conditions, describing "(sample volume/heavy water volume, measurement temperature)" respectively.

FIG. 27 is a chart of $^1$H-NMR of the sodium salt of the present invention (12 mg/700 μl, 24° C.).

FIG. 28 is an enlarged view of the section of δ7.2-8.6 in FIG. 27.

FIG. 29 shows each measured value corresponding to each detected peak in the chart of FIG. 27.

Figure 30:
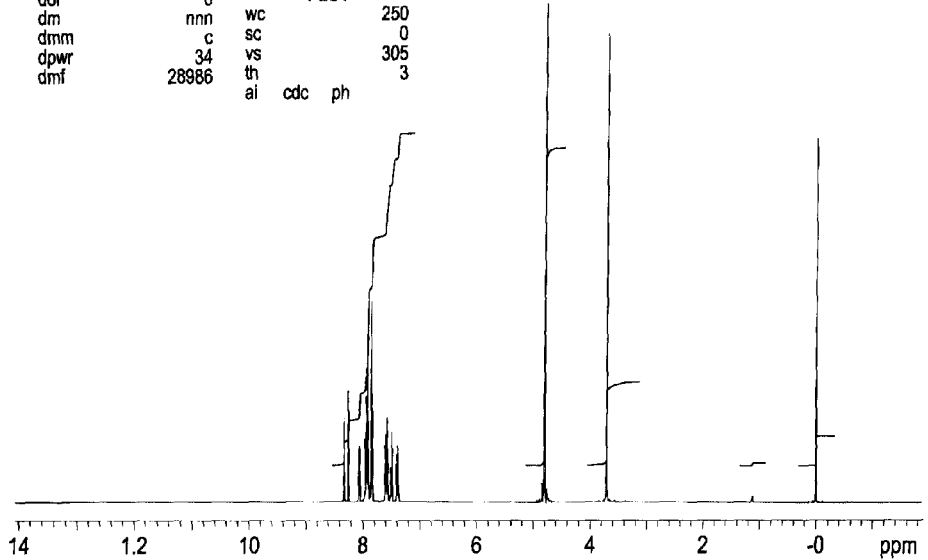
FIG. 30 is a chart of ¹H-NMR obtained by measurement of the sodium salt of the present invention at a concentration of 30 mg/700 µl with D₂O as a solvent at a measurement temperature of 24° C.

FIG. 30 is a chart of $^1$H-NMR of the sodium salt of the present invention obtained by using a sample volume different from that of FIG. 27 (30 mg/700 μl, 24° C.).

Figure 31:
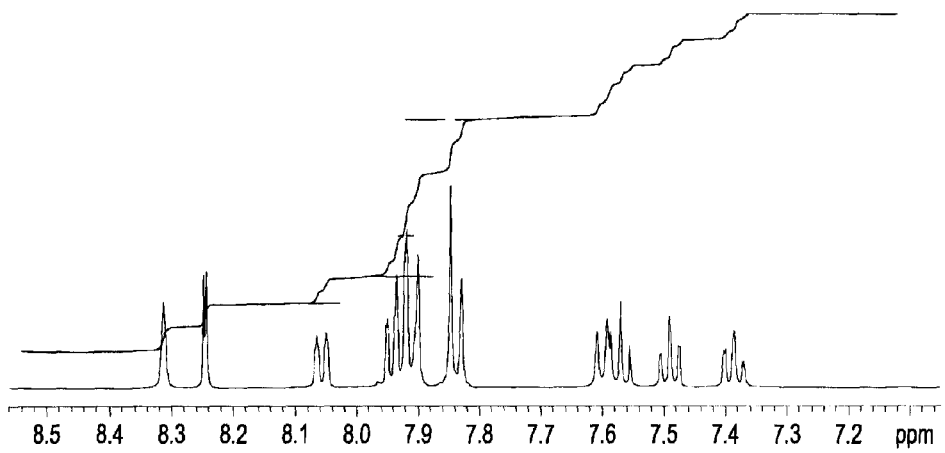
FIG. 31 is an enlarged view of the section of about δ7.1-8.5 in FIG. 30.

FIG. 31 is an enlarged view of the section of about δ7.1-8.5 in FIG. 30.

FIG. 32 shows each measured value corresponding to each detected peak in the chart of FIG. 30.

Figure 33:
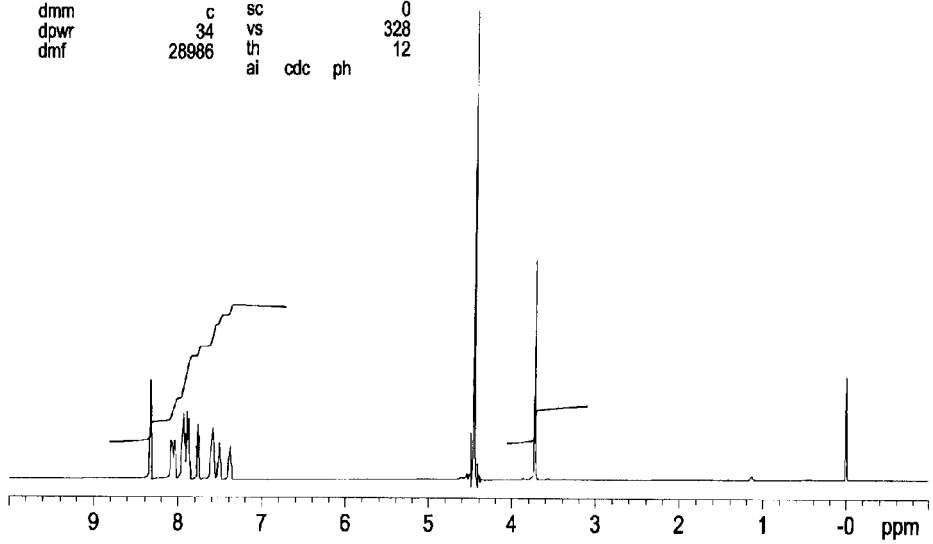
FIG. 33 is a chart of ¹H-NMR obtained by measurement of the sodium salt of the present invention at a concentration of 30 mg/700 µl with D₂O as a solvent at a measurement temperature of 60° C.

FIG. 33 is a chart of $^1$H-NMR of the sodium salt of the present invention obtained by using a measurement temperature different from that of FIG. 30 (30 mg/700 μl, 60° C.).

Figure 34:
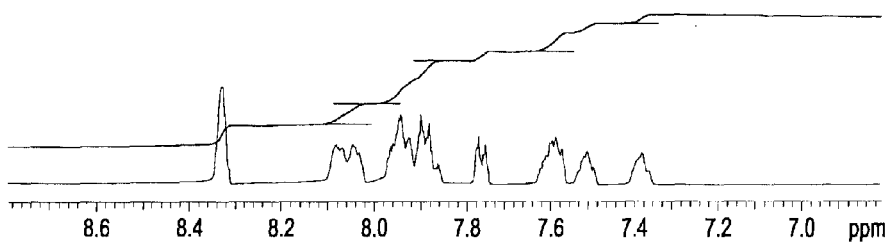
FIG. 34 is an enlarged view of the section of about δ7.0-8.6 in FIG. 33.

FIG. 34 is an enlarged view of the section of about δ7.0-8.6 in FIG. 33.

FIG. 35 shows each measured value corresponding to each detected peak in the chart of FIG. 33.

FIG. 36 is a chart of $^{13}$C-NMR of the sodium salt of the present invention (30 mg/700 μl, 24° C.).

Figure 37:
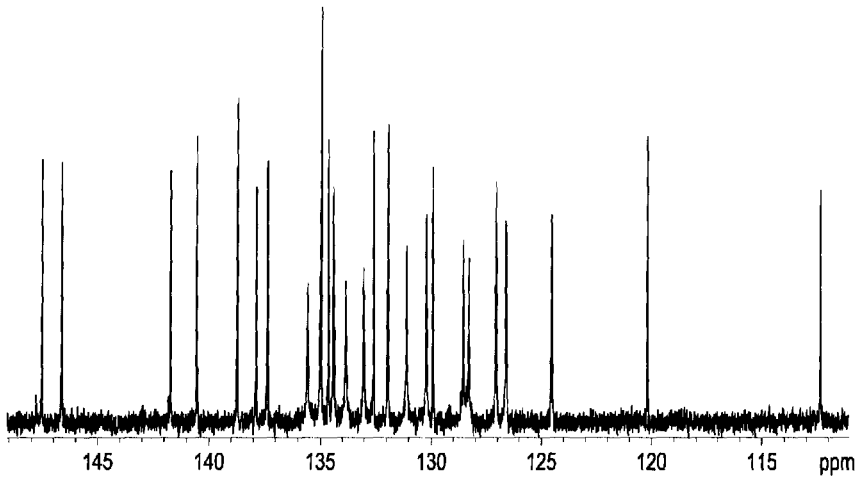
FIG. 37 is an enlarged view of the section of about δ111.0-149.0 in FIG. 36.

FIG. 37 is an enlarged view of the section of about δ111.0-149.0.

FIG. 38 shows each measured value corresponding to each detected peak in the chart of FIG. 36.

One of the reasons why the measurement results in heavy water is not analyzed includes peak broadening in $^1$H-NMR measurement charts. As for each measurement chart in heavy water and heavy DMSO, comparison of each peak separation condition in the area of about δ7.2-8.6 shows that the peaks of the measurement charts in heavy DMSO is clearly sharper and the peak separation conditions are better.

Therefore, it is concluded that using heavy water as a solvent for NMR measurement is not appropriate at least in structural analysis of the sodium salt of the present invention, and the measurement results in heavy DMSO was used as the data for structural analysis, as mentioned above.

The results of $^1$H-NMR measurement of the sodium salt of the present invention in heavy water and the corresponding date of "Coloring matter 1" are shown together in the following Table 103.

TABLE 103

| The sodium salt of the present invention | Date of "Coloring matter 1" |
|---|---|
| 3.72 (3H, s) | 2.78 (3H, s) |
| 12.27 (0.7H, s) | 4.0 (1H, s) |
| — | 6.42 (1H, s) |
| — | 7.02 (1H, d) |
| — | 7.24-7.65 (5H, m) |
| 7.42 (1H, m) | |
| 7.53 (1H, t) | |
| 7.58 (1H, t) | |
| 7.66 (1H, d) | |
| 7.86-7.90 (2H, m) | 7.70-7.80 (3H, m) |
| 7.93-7.96 (3H, m) | |
| 8.02 (1H, d) | |
| 8.06 (1H, m) | 8.21-8.48 (3H, m) |
| 8.24 (1H, d) | |
| 8.33 (1H, s) | |

As described above, the data of $^1$H-NMR spectrum of "Coloring matter 1" described in Patent Literature 2 and the data of said spectrum of the trisodium salt of the formula (1) compound synthesized according to the present invention and structure-determined as described above are absolutely different from each other, confirming that the both are obviously different compounds. The differences will be explained below.

The peaks which are present in "Coloring matter 1" and absent in the sodium salt of the present invention are four peaks of δ2.78 (3H, s), δ4.0 (1H, s), δ6.42 (1H, d) and δ7.02 (1H, d). From analysis of the chemical shift and the number of proton, δ2.78 is methyl at the 15-position in the above formula (101) and δ6.42 and δ7.02 are assumed to be aromatic protons, but any hydrogen atom corresponding to the peak δ4.0 cannot be assumed.

In said spectrum data, one of the most notable features is the chemical shift of the 15-position. In "Coloring matter 1", the value is δ2.78 as mentioned above. On the other hand, the value of the sodium salt of the present invention is about δ3.7, and thus there is an obvious difference.

In $^1$H-NMR, it is known that the compound concentration in the measurement solution and the measurement temperature other than measurement solvent also cause fluctuation of the chemical shift. For this reason, in the present invention, measurement was conducted under the three sets of conditions: the compound concentrations are 12 mg and 30 mg/700 μl; the compound concentration is fixed at 30 mg/700 μl and the measurement temperature is a room temperature; the compound concentration is fixed at 30 mg/700 μl and the measurement temperature is heated to 60° C. As a result, large fluctuations of the chemical shift were not observed for the methyl proton at the 15-position, the values being δ3.72, δ3.70 and δ3.73 respectively, which thus shows a constant value of about δ3.7. These results can be confirmed from FIGS. 29, 32 and 35.

Under any of the above three sets of measurement conditions, the peaks corresponding to the above δ2.78, 4.0, 6.42 and 7.02 whose data are described only for "Coloring matter 1" were not detected in the measurement data of the sodium salt of the present invention. These clearly show that "Coloring matter 1" and the sodium salt of the present invention are different compounds. Judging from the results of structural analysis by the present inventors, the above NMR data for "Coloring matter 1" described in Patent Literature 2 clearly show that the compound of "Coloring matter 1" is not a compound having the structural formula described in Patent Literature 2.

The chemical shift values (by measurement under the conditions: room temperature and a compound concentration of 30 mg/700 μl) as the actual values of $^{13}$C-NMR for the sodium salt of the present invention and the data values of $^{13}$C-NMR for "Coloring matter 1" described in Patent Literature 2 are shown in the following Table 104, corresponding the values respectively.

In this connection, the actual values for the sodium salt of the present invention are, in principal, rounded to the first decimal place for denotation, but the figures of 33.51 and 33.53 and the figures of 134.98 and 135.00 become the same value in this way and therefore they are shown to two decimal places by way of exception.

TABLE 104

| The sodium salt of the present invention | Date of "Coloring matter 1" |
|---|---|
| 33.51 | — |
| 33.53 | 35.0 |
| 112.4 | 117.0 |
| 120.2 | 119.8 |
| 124.5 | 120.5 |
| 126.6 | 124.9 |
| 127.0 | 125.0 |
| 128.3 | 125.1 |
| 128.5 | — |
| 129.9 | 125.9 |
| 130.2 | 127.4 |
| 131.1 | 127.5 |
| 132.0 | 129.3 |
| 132.6 | 130.0 |
| 133.0 | 130.3 |
| 133.9 | 131.0 |
| 134.4 | 132.1 |
| 134.6 | — |
| 134.98 | 133.5 |

TABLE 104-continued

| The sodium salt of the present invention | Date of "Coloring matter 1" |
|---|---|
| 135.00 | 134.2 |
| 135.6 | 134.3 |
| 137.4 | 135.5 |
| 137.9 | 136.5 |
| 138.8 | 138.0 |
| 140.5 | 144.0 |
| 141.7 | 140.3 |
| 146.6 | 144.8 |
| 147.5 | 161.1 |
| 162.3 | 162.3 |
| 186.2 | 187.0 |
| 200.4 | — |

In a molecule of the sodium salt of the present invention, 30 carbon atoms are present. Therefore, 30 peaks are basically detected.

As is clear from the results of Table 104, there are only 27 peaks detected for "Coloring matter 1". For the sodium salt of the present invention, 31 peaks are detected, whereby it is assumed that this is because the measurement conditions are not optimized. In other words, the column under "INDEX" in FIG. 38 shows detected peaks and the number confirms that there are 33 detected peaks. Among them, INDEXES 32 and 33 are TSP as IS and typically observed as one peak. However, this is counted as two peaks in the present measurement and therefore it is assumed that the above conditions were not optimized.

However, as for the ammonium salt of the present invention, it can be confirmed that there are 30 peaks other than the peaks of the measurement solvent, as is clear from FIGS. 9 to 13, whereby determination of the above chemical structural formula has no problem at all.

The relation of the number of the detected peaks with the chemical shift areas where the peaks were detected is shown in the following Table 107.

TABLE 107

| | The number of the detected peaks | |
|---|---|---|
| Chemical shift area | The sodium salt of the present invention | "Coloring matter 1" |
| $0 < \delta < 120$ | 3 | 3 |
| $120 \leq \delta < 130$ | 7 | 8 |
| $130 \leq \delta < 140$ | 14 | 10 |
| $140 \leq \delta < 150$ | 4 | 3 |
| $150 \leq \delta < 200$ | 2 | 3 |
| $200 \leq \delta$ | 1 | 0 |

As is clear from Table 104 and Table 107, each chemical shift value and the number of the peaks distributed in each chemical shift area is obviously different between the sodium salt of the present invention and "Coloring matter 1", and also in $^{13}$C-NMR, the sodium salt of the present invention and "Coloring matter 1" are obviously different compounds.

As the compound of the present invention contained in the ink composition of the present invention, it is preferable to use the compound containing a smaller amount of inorganic substances such as chloride and sulfate of metal cation as impurities in a bulk and the content is, for example, about 1% by weight or less only as a guide. In order to produce the bulk of the coloring matter having a smaller amount of inorganic substances, for example, desalting treatment may be carried out by a typical method such as a method using a reverse osmosis membrane.

The ink composition of the present invention is prepared by dissolving the compound of the present invention in water or an aqueous solvent (water containing a water-soluble organic solvent described later). For example, when the compound of the present invention is synthesized, naturally the reaction liquid of the synthesis reaction contains the compound of the present invention. Therefore, such a reaction liquid can be directly used for production of an ink composition. Further, the intended product may be isolated from the reaction liquid, dried, for example spray-dried, and then processed into an ink composition.

In addition, a compound of the above formula (1) may be synthesized and dissolved in ammonia water or a composition containing an ammonia source or a sodium source such as a sodium hydroxide to prepare an ink composition of the present invention.

The ink composition of the present invention contains an ammonium salt or a sodium salt of a compound represented by the formula (1), preferably the triammonium salt or the trisodium salt having the above NMR spectrum and particularly preferably the triammonium, in an amount of typically 0.1 to 20% by weight, preferably 1 to 15% by weight and further preferably 2 to 10% by weight. The ink composition of the present invention may contain 0 to 30% by weight of a water-soluble organic solvent and 0 to 5% by weight of an ink preparation agent, respectively. Preferably, it contains 5 to 30% by weight of a water-soluble organic solvent.

It is advisable that the compound of the present invention is contained in an ink composition of the present invention at an area ratio of 85% or more, preferably of 90% or more and further preferably of 95% or more by HPLC. The upper limit may be below detection limit of the content of impurities, i.e., 100%.

In order that the ink composition of the present invention exerts the effects described below, it is advisable that the lower limit of the compound purity of the present invention is 85% or more as described above, and that particularly when a disulfo compound such as the above formula (3) is present as a mixture, the mixture ratio of disulfo compound is preferably 15% or less, more preferably 10% or less and particularly preferably 5% or less.

Specific examples of the water-soluble organic solvent to be used in preparation of the ink composition include, for example, C1 to C4 alkanols such as methanol, ethanol, n-propanol, isopropanol, n-butanol, isobutanol, secondary butanol and tertiary butanol; carboxylic acid amides such as N,N-dimethylformamide or N,N-dimethylacetoamide; lactams such as 2-pyrrolidone and N-methyl-2-pyrrolidone; cyclic ureas such as 1,3-dimethylimidazolidin-2-one or 1,3-dimethylhexahydropyrimid-2-one; ketones or keto alcohols such as acetone, methyl ethyl ketone and 2-methyl-2-hydroxypentan-4-one; cyclic ethers such as tetrahydrofuran and dioxane; mono-, oligo- or polyalkylene glycols or thioglycols having a (C2 to C6) alkylene unit such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, thiodiglycol, polyethylene glycol, polypropylene glycol; polyols (triols) such as glycerine and hexane-1,2,6-triol; (C1 to C4) alkyl ethers of polyhydric alcohol such as ethylene glycol monomethyl ether, ethylene glycol monoethyl ether, diethylene glycol monomethyl ether, diethylene glycol monoethyl ether, butyl carbitol (diethylene glycol monobutyl ether), triethylene glycol monomethyl ether or triethylene glycol monoethyl ether; γ-butyrolactone; or dimethylsulfoxide; and the like. These water-soluble organic solvents can be used alone or as a mixture thereof.

Among them, preferable are 2-pyrrolidone, N-methyl-2-pyrrolidone, mono, di or triethylene glycol, dipropylene glycol, isopropylalcohol and butyl carbitol, and more preferably 2-pyrrolidone, N-methyl-2-pyrrolidone, diethylene glycol, isopropylalcohol and butyl carbitol.

Hereinafter, ink preparation agents which can be used in preparation of the ink composition of the present invention will be explained. Specific examples of the ink preparation agents include, for example, an antiseptic and fungicide, a pH adjuster, a chelating agent, a rust-preventive agent, a water-soluble UV absorbing agent, a water-soluble polymer compound, a dye dissolving agent, a surfactant and the like.

Examples of the antiseptic and fungicide include, for example, organic sulfur-based, organic nitrogen sulfur-based, organic halogen-based, haloallylsulfone-based, iodopropargyl-based, N-haloalkylthio-based, benzothiazole-based, nitrile-based, pyridine-based, 8-oxyquinoline-based, benzothiazole-based, isothiazoline-based, dithiol-based, pyridineoxide-based, nitropropane-based, organic tin-based, phenol-based, quaternary ammonium salt-based, triazine-based, thiadiazine-based, anilide-based, adamantane-based, dithiocarbamate-based, brominated indanone-based, benzyl bromoacetate-based and inorganic salt-based compounds. Examples of the organic halogen-based compound include, for example, sodium pentachlorophenol; examples of the pyridineoxide-based compound include, for example, 2-pyridinethiol-1-oxide sodium; and examples of the isothiazoline-based compound include, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride and the like. Examples of other antiseptics and fungicides include inorganic salt compounds of organic acids such as anhydrous sodium acetate, sodium sorbate or sodium benzoate.

As the pH adjuster, any can be used as long as it can control the pH of ink in the range of 8.0 to 11.0 without exerting adverse effects on the ink to be prepared. Examples of such pH adjusters include, for example, alkanolamines such as diethanolamine and triethanolamine, alkali metal hydroxides such as lithium hydroxide, sodium hydroxide and potassium hydroxide, ammonium hydroxide, or alkali metal carbonates such as lithium carbonate, sodium carbonate and potassium carbonate, and the like.

Examples of the chelating agent include, for example, sodium ethylenediaminetetraacetate, sodium nitrilotriacetate, sodium hydroxyethylethylenediamine tetraacetate, diethylenetriamine sodium pentaacetate, sodium uracil diacetate and the like.

Examples of the rust-preventive agent include, for example, hydrogen sulfite salts, sodium thiosulfate, ammonium thioglycolate, diisopropylammonium nitrite, pentaerythritol tetranitrate, dicyclohexylammonium nitrite and the like.

Examples of the water-soluble UV absorbing agent include, for example, sulfonated benzophenone, sulfonated benzotriazole or the like.

Examples of the water-soluble polymer compound include, for example, polyvinyl alcohol, cellulose derivatives, polyamines, polyimines and the like.

Examples of the dye dissolving agent include, for example, ureas, ε-caprolactam, ethylene carbonates and the like.

Examples of the surfactant included, for example, anionic surfactants, amphoteric surfactants, cationic surfactants, nonionic surfactants and the like.

Examples of the anionic surfactant include alkyl sulfocarboxylate, α-olefin sulfonate, polyoxyethylene alkyl ether acetate, N-acyl amino acid and a salt thereof, N-acylmethyltaurine salt, rosin acid soap, castor oil sulfate, lauryl alcohol sulfate, alkylphenol type phosphate ester, alkyl type phosphate ester, alkyl allylsulfonate, diethyl sulfosuccinate, diethylhexyl sulfosuccinate, dioctyl sulfosuccinate and the like.

Examples of the amphoteric surfactant include lauryldimethylaminoacetic acid betaine, 2-alkyl-N-carboxymethyl-N-hydroxyethyl imidazolinium betaine, coconut oil fatty acid amide propyldimethylaminoacetic acid betaine, polyoctylpolyaminoethylglycine, and others such as imidazoline derivatives.

Examples of the cationic surfactant include 2-vinylpyridine derivatives, poly(4-vinylpyridine) derivatives and the like.

Examples of the nonionic surfactants include ether-based surfactants such as polyoxyethylene nonylphenyl ether, polyoxyethylene octylphenyl ether, polyoxyethylene dodecylphenyl ether, polyoxyethylene oleyl ether, polyoxyethylene lauryl ether and polyoxyethylene alkyl ether, ester-based surfactants such as polyoxyethylene oleic acid, polyoxyethylene oleate ester, polyoxyethylene distearate ester, sorbitan laurate, sorbitan monostearate, sorbitan monooleate, sorbitan sesquioleate, polyoxyethylene monooleate and polyoxyethylene stearate, acetylene glycol (alcohol)-based surfactants such as 2,4,7,9-tetramethyl-5-desine-4,7-diol, 3,6-dimethyl-4-octine-3,6-diol, 3,5-dimethyl-1-hexin-3-ol (for example, trade name: Surfynol© 104, 82 and 465, Olfine© STG and the like, manufactured by Nissin Chemical Industry Co., Ltd.) and the like.

These ink preparation agents can be used alone or as a mixture thereof.

The water-based ink composition of the present invention can be produced by dissolving the compound of the present invention together with the above ink preparation agents in water or the above aqueous solvent or water containing a water-soluble organic solvent, or the like.

In the above production method, the sequence order of dissolving each component is not particularly limited. The compound of the present invention may be beforehand dissolved in water or the above aqueous solvent or water containing a water-soluble organic solvent, or the like, and then ink preparation agents may be added and dissolved therein; or the compound of the present invention may be dissolved in water and then an aqueous solvent and ink preparation agents may be dissolved therein. In addition, the sequence order may be different from the above.

Alternatively, an aqueous solvent and ink preparation agents may be added to the reaction liquid in synthesis of the compound of the present invention as described above, or to a treated liquid by desalting treatment using a reverse osmosis membrane for removing an inorganic salt which is impurity from the compound of the present invention to produce an ink composition. Water to be used in preparation of the ink composition preferably contains a smaller amount of impurities, such as ion-exchanged water or distilled water. In addition, foreign substances are, according to necessity, removed off by microfiltration using a membrane filter or the like, and preferably microfiltration is carried out particularly when the ink is used for inkjet printers. The pore size of filter used for microfiltration is typically 1 micron to 0.1 micron and preferably 0.8 micron to 0.2 micron.

The magenta ink composition containing the compound of the present invention is suitably used for impress printing, copying, marking, writing, drafting, stamping, or recording, particularly inkjet recording. In such a case, high quality, magenta-printed matters having good fastnesses against sunlight, ozone, friction and particularly water are obtained. In addition, it is possible to adjust to a desired color tone with an orange tinge, a red tinge and the like by a dye such as yellow, magenta or the like which are known and/or generally used further being mixed to the compound of the present invention. Further, it can be also used as a coloring matter for color toning of other colors, particularly black.

The colored product of the present invention means a material colored with the compound of the present invention. The material to be colored are not particularly limited, and examples thereof include, for example, paper, fiber, cloth (cellulose, nylon, wool and the like), leather, substrates for color filters and the like, but are not limited thereto. Examples of coloration include, for example, printing methods such as dip dyeing, textile printing and screen printing, a method using an inkjet printer, and the like, and preferable is a method using an inkjet printer.

Examples of record-receiving materials (medium) to be applied to the inkjet recording method of the present invention include, for example, communication sheets such as paper and film, fiber, leather and the like. The communication sheets are preferably surface-treated, specifically provided with an ink receiving layer on their substrates. The ink receiving layer can be provided, for example, by impregnation or coating of a cation polymer on the above substrate; or by coating of a porous white inorganic substance to absorb the coloring matter in the ink such as porous silica, aluminasol or special ceramics together with a hydrophilic property polymer such as polyvinyl alcohol or polyvinylpyrrolidone, on the above substrate surface. Such a record-receiving material as provided with an ink receiving layer is typically called inkjet special paper (film) or glossy paper (film), and examples thereof include: for example, trade name: Pictorico© (which is manufactured by Asahi Glass Co., Ltd.); trade name: Professional Photopaper, Super Photopaper and Matte Photopaper (which are all manufactured by Canon Inc.); trade name: Photo Paper (glossy), Photo Matte Paper and Super Fine Glossy Film (which are all manufactured by Seiko Epson Corporation); trade name: Advanced Photo Paper (glossy), Premium Plus Photo Paper, Premium Glossy Film and Photo Paper (which are all manufactured by Hewlett-Packard Japan, Ltd.); trade name: PhotoLike©QP (which is manufactured by KONICA Corporation); and the like. In this connection, plain paper can be naturally used.

Among these record-receiving materials, it is known that images recorded on a material coated with a porous white inorganic substance on the surface thereof suffer from more serious discoloration or fading by ozone gas, but the compound of the present invention is excellent in gas fastness and therefore it particularly exerts its effects in the case of recording on such a record-receiving material.

Examples of porous white inorganic substances to be used for the above purpose include calcium carbonates, kaolins, talcs, clays, diatom earthes, synthesized amorphous silica, aluminum silicates, magnesium silicates, calcium silicates, aluminium hydroxides, aluminas, lithopones, zeolites, barium sulfates, calcium sulfates, titanium dioxides, zinc sulfides, zinc carbonates and the like.

In order that recording is conducted on a record-receiving material by the inkjet recording method of the present invention, for example, a container containing an ink composition of the present invention may be placed in a predetermined position of an inkjet printer and recording may be conducted on a record-receiving material in a typically manner. By using the inkjet recording method of the present invention, known green, orange, blue (or violet) ink compositions and a magenta ink composition of the present invention, and further according to necessity, a known black ink composition in addition to known yellow and cyan ink compositions can be used in combination.

Each of said color ink compositions may be filled in each container and then the each container is placed (loaded) in each predetermined position in an inkjet printer similarly to the container containing an ink composition of the present invention. Examples of the inkjet printer include, for example, a piezo inkjet printer using mechanical vibration, a bubble jet (registered trademark) printer using bubbles generated by heating, and the like, and any of them can be used.

The ink composition of the present invention has a vivid magenta color and exhibits a very vivid hue particularly on inkjet glossy papers, and also a recorded image therewith has a high fastness. In addition, it is highly safe to human beings.

The ink composition of the present invention is free from deposition or separation during storage. In addition, when the ink of the present invention is used in inkjet recording, it does not cause clogging of an injector (inkhead). The ink of the present invention is free from changes in physical properties under constant recirculation for a relatively long time by a continuous inkjet printer or in intermittent use by an on-demand printer.

EXAMPLES

Hereinafter, the present invention will be more specifically explained with reference to Examples. In this connection, "parts" and "%" here are respectively by weight unless otherwise specified.

The purity of the intended compound was determined by the area ratio using HPLC. The analysis equipment and the analysis conditions are as follows.

HPLC equipment to be used and measurement conditions:
Apparatus; HP1100 (manufactured by HP)
Column; YMC-Pack ODS-A (5 μm)
   3.0×150 mm (manufactured by YMC)
Column temperature; 40° C.
Mobile phase; A solution: 5 mM AcONH4, B solution: CH3CN
Gradient; Bconc 5%-(30 min)-50%
Flow rate; 0.25 ml/min
Sample concentration; 1000 ppm
Injection volume; 5 μl $^1$H and $^{13}$C-NMR were measured using the following equipments:
Apparatus 1: UNITY INOVA 400 (manufactured by Varian Inc.)
Apparatus 2: Avance 400 (manufactured by Bruker BioSpin)
Apparatus 3: Varian NMR System 500M (manufactured by Varian Inc.)

As the internal standard substance, TMS (tetramethylsilane) was used in the case of the heavy organic solvent, and TSP (3-sodium trimethylsilylpropionate) was used in the case of heavy water.

Apparatus 3 was used when the compound concentration in the measurement solution and the measurement temperature were changed, in other words, it was used for the measurement under three conditions: the compound concentration is 12 mg/700 μl (room temperature), 30 mg/700 μl (room temperature) and 30 mg/700 μl (60° C.). In this connection, the room temperature in this measurement was 24° C.

In structure determination of the ammonium salt of the present invention, COSY, HOHAHA and NOESY spectrums were measured in addition to usual measurement for $^1$H-NMR.

Further, DEPT, HMQC and HMBC spectrums were measured in addition to usual measurement for $^{13}$C-NMR.

Each of the above spectrums was comprehensively analyzed and attribution of each hydrogen atom and each carbon atom was determined. In this connection, attribution of carbon atoms to which no hydrogen atom is bonded cannot be determined in the present analysis, but it is well known that an anthrapyridone structure can be built by the synthesis method described below and therefore it is considered that the above analysis can give sufficient data for determination of the chemical structure of the compound of the present invention.

Measurement by LC-MS was conducted under the following conditions:

Measuring equipment; LCT (manufactured by JASCO INTERNATIONAL)
Column; Inertsil ODS-II, 2.1 mm×250 mm, (5 μm)
Mobile phase; A solution: 5 mM CH3COONH4/H2O, B solution: CH3CN
Gradient; B conc 5%-30 min-50%
Flow speed; 0.2 ml/min
Column temperature; 40° C.
MS; m/e 100 to 2000
Sample Cone; 30 V
Rf Lens; 300 V
Ionization method; ESI (nega)

Example 1

Synthesis of the Ammonium Salt of the Present Invention (1) According to the method described in Patent Literature 1, an intermediate of the above formula (2) was obtained.

(2) Subsequently, to 384.6 parts of 96.0% sulfuric acid, 575.4 parts of 31.9% fuming sulfuric acid were added under stirring and water-cooling to prepare 960 parts of 12% fuming sulfuric acid. Under water-cooling, 136.8 parts of the compound of the above formula (2) were added thereto at 50° C. or under, raised in temperature and reacted (sulfonation) at 80 to 90° C. for 3 hours. Next, while adding ice to 1200 parts of ice water, the above-obtained sulfonation reaction liquid was added thereto with the temperature maintained at 40° C. or under in the meantime. Water was added thereto to bring the liquid volume to 2600 parts, which was then filtrated to remove insoluble matter. Next, hot water was added to the mother liquid to bring the volume to 3000 parts, the temperature was adjusted to 40 to 45° C., and then 690 parts of ammonium chloride were added thereto and stirred for 1 hour to precipitate crystals, which were then taken out by filtration to obtain 895 parts of wet cake containing a ammonium salt of a compound of the above formula (1) as red crystals.

(3) The wet cake obtained in the above (2) was dissolved in hot water to be adjusted to 1500 parts, the liquid temperature was adjusted at 50° C., and then 330 parts of ammonium chloride were added thereto and stirred for 6 hours. The precipitated crystals were taken out by filtration to obtain 290 parts of wet cake containing a triammonium salt of a compound of the formula (1) as red crystals. Maximum absorption wavelength (λmax): 534 nm (in aqueous solution)
HPLC purity: 99.5%

(4) In water, 290 parts of the red crystal obtained in (3) was dissolved and 28% ammonia water was added thereto to adjust the pH of the solution to 7 to 10, followed by desalting treatment using a reverse osmosis membrane. For the content of inorganic impurities after the desalting treatment, $SO_4^{2-}$-ion was measured using an ion chromatography method and the weight of $(NH_4)_2SO_4$ was calculated on the basis of the measured $SO_4^{2-}$-ion, resulting in 1% or less.

Ion-exchanged water was added to the solution obtained by the desalting treatment to adjust the concentration of the triammonium salt of the compound of the formula (1) to 10% and an aqueous solution (2465 parts) having a coloring matter concentration of 10% for ink was obtained.

Example 2

Synthesis of the Sodium Salt of the Present Invention (1) The wet cake obtained in (2) of Example 1 was dissolved in water and adjusted the total amount to 1500 parts, and then 300 parts of sodium chloride were added thereto and stirred at room temperature for 1 hour. The resulting precipitated crystals were filtrated to obtain a wet cake, which was washed with 400 parts of an aqueous solution of 20% sodium chloride to obtain 377 parts of wet cake containing a trisodium salt of the present invention as red crystals.

Maximum absorption wavelength (λmax): 534 nm (in aqueous solution)
HPLC purity: 99.0%

LC-MS: m/z 695=[(696−H$^+$)]$^−$ m/z 347=[(696−2H$^+$)/2]$^{2−}$ m/z 231=[(696−3H$^+$)/3]$^{3−}$ (2) In water, 290 parts of the red crystal obtained in (1) was dissolved, and 25% sodium hydroxide was added thereto to adjust the pH of the solution to 7 to 10, and desalting treatment was carried out by a reverse osmosis membrane. The content of inorganic impurities after the desalting treatment was measured using an ion chromatography method as ion of Cl$^−$ ion and the weight of NaCl was calculated on the basis of the measured Cl$^−$ ion resulting in 1% or less. Ion-exchanged water was added to the solution obtained by the desalting treatment to adjust the concentration of the trisodium salt of the compound of the formula (1) to 10% and an aqueous solution (2465 parts) having a coloring matter concentration of 10% for ink was obtained.

Example 3

(A) Preparation of Ink

Using the aqueous solution (aqueous ammonium salt solution) having a coloring matter concentration of 10% for ink obtained in the above Example 1, an liquid composition was prepared in accordance with the composition shown in Table 1 and filtrated by a 0.45 μm membrane filter to obtain an ink composition of Example 3. Using this ink composition, inkjet recording was conducted and recorded images were evaluated. The results of the evaluation on hue and vividness are shown in Table 2 and the results of the evaluation on light fastness, ozone fastness and water fastness are shown in Table 3.

TABLE 1

(Composition of ink)

| | |
|---|---|
| The aqueous solution having a coloring matter concentration of 10% for the ink in Example 1 | 35.0 parts |
| Glycerine | 5.0 parts |
| Urea | 5.0 parts |
| N-methyl-2-pyrrolidone | 4.0 parts |
| Isopropylalcohol | 3.0 parts |
| Butyl carbitol | 2.0 parts |
| Trade name: Surfynol 104PG50 (nonionic surfactant, manufactured by Nissin Chemical Industry Co., Ltd.) | 0.1 part |
| Ion-exchanged water | 45.9 parts |
| Total | 100.0 parts |

Example 4

In the same manner as in Example 3 except that the aqueous solution having a coloring matter concentration of 10% for ink obtained in Example 2 was used instead of the aqueous solution having a coloring matter concentration of 10% for ink obtained in Example 1, an ink composition of Example 4 of the present invention was obtained. Using the obtained ink composition, the same evaluations as in Example 3 were conducted and the results are shown in Table 3.

Example 5

To the ink composition containing an ammonium salt of the present invention therein obtained in Example 3, the later-described ink composition obtained in Comparative Example 2 was added to obtain ink compositions where the purities of the ammonium salt of the present invention were respectively 93% and 86%. The ink composition having a purity of 93% is referred to as Example 5-1 and the ink composition having a purity of 86% is referred to as Example 5-2. They were evaluated in the same manner as in Example 3. The results are shown in Table 3. In this connection, the total amounts of coloring matter in these ink compositions are respectively 10%.

Comparative Example 1

For comparison, a mixture of the compounds No. 36 and No. 26 of Patent Literature 1 were obtained in accordance with Example 7 in Patent Literature 1. This mixture is a sodium salt and the synthesis method is as follows.
(1) Mixed are 23.6 parts of 1-methylamino-4-anilino anthraquinone, 0.75 parts of sodium carbonate, 36.0 parts of ethyl benzoylacetate and 75 parts of orthodichlorobenzene, which were heated to 170° C. and reacted for 3 hours. This reaction was carried out while distilling produced ethanol and water out of the reaction system. After completion of the reaction was confirmed by HPLC, the reaction liquid was water-cooled and 150 parts of methanol were added thereto and stirred for 1 hour. The resulting precipitated crystals were taken out by filtration and washed with 200 parts of methanol and sequentially with water to obtain a solid, which was further dried to obtain 28.8 parts of a red solid.
(2) Under cooling with ice water, 39.6 parts of 30% fuming sulfuric acid were added to 24.0 parts of 96% sulfuric acid to prepare 12% fuming sulfuric acid. To this solution, 8.8 parts of the red solid obtained in the above (1) were so added that the liquid temperature of the reaction liquid was under 20° C., and the sulfonation reaction was carried out at a temperature of 40 to 45° C. for 5 hours. The resulting reaction liquid was added to 400 parts of ice water under stirring and then 80 parts of sodium chloride were added thereto and further stirred for 2 hours. The precipitated solid was taken out by filtration and dried to obtain 12.3 parts of a mixture of Compounds No. 36 and No. 26 described in Patent Literature 1 as red powder. The analysis values of the resulting mixture are as follows.

HPLC purity of Compound No. 36: 77.3%

LC-MS: m/z 695=$[(696-H^+)]^-$ m/z 347=$[(696-2H^+)/2]^{2-}$ m/z 231=$[(696-3H^+)/3]^{3-}$

HPLC purity of Compound No. 26: 16.2%

LC-MS: m/z 615=$[(616-H^+)]^-$ m/z 307=$[(616-2H^+)/2]^{2-}$

In the same manner as in Example 3 except that an aqueous solution having a coloring matter concentration of 10% prepared using the obtained mixture (coloring matter) was used, an ink composition of Comparative Example 1 was prepared, and evaluated in the same manner as in Example 3.

Comparative Example 2

The mixture obtained in Comparative Example 1 was dissolved in water and 28% ammonia water was added thereto to adjust the pH to about 10, and then ion-exchanged water was added thereto to prepare an aqueous solution having a coloring matter concentration of 10%. In the same manner as in Example 3 except that the above-obtained aqueous solution having a coloring matter concentration of 10% was used instead of the aqueous solution having a dye concentration of 10% used in Example 3, an ink composition of Comparative Example 2 was obtained. The obtained ink composition was evaluated in the same manner as in Example 3. The results are shown in Table 3.

(B) Inkjet Printing

Using an inkjet printer (Pixus 4100i, manufactured by Canon Inc.), inkjet recording was performed on two types of glossy paper having an ink image receiving layer containing a porous white inorganic substance, i.e., trade name: CRISPIA® manufactured by Seiko Epson Corporation and trade name: Advanced Photo Paper (glossy) manufactured by HP. When inkjet recording, an image pattern was made so as to obtain several gradations of print density and printed matters were made.

(C) Evaluation of Recording Image

1. Hue Evaluation
1-1. Hue Evaluation for Glossy Paper

Hue and vividness of recorded images: Using a colorimetric system (GRETAG SPM50: manufactured by GRETAG-MACBETH AG), the hue and vividness of the recorded papers were measured and values thereof L*, a* and b* were calculated, and for vividness, $C^*=((a^*)^2+(b^*)^2)^{1/2}$ was calculated from the chromaticities (a* and b*). The results of hue evaluation for Example 3 and Comparative Example 1 are shown in Table 3. In this connection, a lager L* value means a higher brightness and a larger C* value means a higher vividness.

TABLE 2

| | L* | Hue a* | b* | Vividness C* |
|---|---|---|---|---|
| Glossy paper manufactured by Seiko Epson Corporation | | | | |
| Example 3 | 50.3 | 83.8 | −25.2 | 87.7 |
| Comparative Example 1 | 47.9 | 83.9 | −22.5 | 86.9 |
| Glossy paper manufactured by HP | | | | |
| Example 3 | 49.8 | 83.3 | −26.7 | 87.5 |
| Comparative Example 1 | 46.9 | 82.9 | −27.9 | 87.4 |

Judging from Table 2, the image of Example 3 of the present invention has the almost same C* value showing vividness as that of Comparative Example 1 when any of the glossy papers is used, but it has a 5% higher L* value compared with Comparative Example 1 when Glossy paper manufactured by Seiko Epson Corporation is used and a 6% higher L* value compared with Comparative Example 1 when Glossy paper manufactured by HP is used. From this result, it is found that the ink composition of the present invention exhibits high vividness and provides a recorded image having a more excellent brightness than that of the mixture of Comparative Example 1.

(D) Xenon Light Fastness Test of Recorded Images

A glass plate having a thickness of 2 mm was put in order to provide an air layer on test pieces printed on Glossy paper manufactured by Seiko Epson Corporation and Glossy paper manufactured by HP, and then irradiation was conducted for 50 hours under the environment of an illuminance of 0.36 W/m$^2$, a humidity of 60% RH and a temperature of 24° C. using a xenon weatherometer Ci4000 (manufactured by ATLAS), and the color difference (ΔE) before and after the test was measured and evaluated. The results are shown in Table 3.

(E) Ozone Gas Fastness Test of Recorded Images

Test pieces printed on Glossy paper manufactured by Seiko Epson Corporation and Glossy paper manufactured by HP were left for 4 hours under the environment of an ozone concentration of 12 ppm, a humidity of 60% RH and a temperature 24° C. using an ozone weatherometer (manufactured by Suga Test Instruments Co., Ltd.), and the color difference (ΔE) before and after the test was measured and evaluated. The results are shown in Table 3.

(F) Water Fastness Test of Recorded Images

A drop of water was placed respectively on test pieces printed on Glossy paper manufactured by Seiko Epson Corporation and Glossy paper manufactured by HP, which were left for 1 hour under room temperature and then wiped. Blurring after the wiping was judged by visual observation and evaluated on the following five levels. The results are shown in Table 3.
 ο: No blurring is observed.
 οΔ: Slight blurring is observed which is judged between α and Δ.
 Δ: Slight blurring is observed.
 ΔX: Relatively large blurring is observed which is judged between Δ and X.
 X: Large blurring is observed.

TABLE 3

| | Light fastness | Ozone gas fastness | Water fastness |
|---|---|---|---|
| Glossy paper manufactured by Seiko Epson Corporation | | | |
| Example 3 | 3.6 | 1.5 | οΔ |
| Example 4 | 3.6 | 1.5 | οΔ |
| Example 5-1 | 3.8 | 1.5 | οΔ |
| Example 5-2 | 3.8 | 1.5 | οΔ |
| Comparative Example 1 | 4.0 | 2.5 | x |
| Comparative Example 2 | 3.9 | 2.2 | x |
| Glossy paper manufactured by HP | | | |
| Example 3 | 3.6 | 2.4 | ο |
| Example 4 | 3.8 | 2.6 | ο |
| Example 5-1 | 3.5 | 1.6 | ο |
| Example 5-2 | 3.3 | 1.7 | ο |
| Comparative Example 1 | 4.9 | 2.7 | x |
| Comparative Example 2 | 4.4 | 2.7 | x |

Judging from Table 3, in the case that Glossy paper manufactured by Seiko Epson Corporation is used, the ink composition of the present invention has a little more excellent light fastness compared with that of each Comparative Example, but for ozone gas fastness, any of the values of Examples of the present invention is 1.5 while the values of Comparative Examples are respectively 2.2 and 2.5, showing improvement of color difference of 0.7 to 1 point.

On the other hand, in the case of that Glossy paper manufactured by HP is used, the ozone gas fastness of Examples of the present invention is a little more excellent than that of Comparative Examples, but a large difference in light fastness is observed between them because the values of Examples of the present invention are respectively 3.3 to 3.8 while the values of Comparative Examples are respectively 4.4 and 4.9, showing improvement of color difference (ΔE) of 0.6 points at the least and 1.6 points at the most.

It is water fastness that should be noted. Large blurring was observed by visual observation on any glossy paper in the case of Comparative Examples, while no blurring is observed on Glossy paper manufactured by HP and only a little blurring was observed on Glossy paper manufactured by Seiko Epson Corporation in the case of Examples of the present invention, whereby it is found that the ink composition of the present invention can provide images extremely excellent in water fastness.

It was considered that the mixture of Comparative Example 1 contains a compound of the above formula (3) where only two sulfo groups as hydrophilic groups are introduced and therefore that it had a lower affinity to water than the compounds of the present invention. Therefore, it was predicted that the mixture had better results than the compounds of the present invention with regard to water fastness. However, as is clear from the results of the water fastness test, it is found that the ink compositions of the present invention which were considered to have higher hydrophilic property have a much more excellent water fastness than those of Comparative Examples and can be more suitably used for inkjet recording than those of Comparative Examples particularly in this regard.

In addition, as for Examples 5-1 and 5-2, the contents of the ammonium salt of the present invention relative to the total amount of the coloring matter in the ink composition are respectively adjusted to 93% and 86% by HPLC area ratio by addition of the mixture obtained in Comparative Example 2 to the compound of the present invention. Comparative Example 1 is an ink composition containing a sodium salt of the present invention and Comparative Example 2 is an ink composition containing an ammonium salt of the present invention, in an area ratio of 77% by HPLC, respectively.

As is clear from Table 3, it is found that Examples 5-1 and 5-2 containing an ammonium salt of the present invention in an amount of 93% and 86% respectively relative to the total amount of the coloring matter in the ink composition are also more excellent in water fastness and ozone fastness than Comparative Examples. Therefore, it is clear that the content of the compound of the present invention relative to the total amount of the coloring matter in the ink composition is not necessarily 100% and the content of about 85% or more allows beneficial effects on water fastness. In addition, when the content of the compound of the present invention in an ink composition is about 70%, the effects on at least water fastness which are possessed by the compound of the present invention cannot be obtained.

Example 6

In order to compare performance of the ammonium salt with that of the sodium salt of the present invention, ink compositions having the following composition denoted in Table 4 were prepared and the following tests of light fastness and water fastness thereof were conducted. An ink composition prepared using the ammonium salt (compound of Example 1) is referred to as Example 6-1 and an ink composition prepared using the sodium salt (compound of Example 2) is referred to as Example 6-2.

TABLE 4

| (Composition of ink) | |
|---|---|
| The aqueous solution having a coloring matter concentration of 10% for ink in Examples 1 or 2 | 70.0 parts |
| Glycerine | 5.0 parts |
| Urea | 5.0 parts |
| N-methyl-2-pyrrolidone | 4.0 parts |
| Isopropyl alcohol | 3.0 parts |
| Butyl carbitol | 2.0 parts |
| Trade name: Surfynol 104PG50 (nonionic surfactant, manufactured by Nissin Chemical Industry Co., Ltd.) | 0.1 part |
| Ion-exchanged water | 10.9 parts |
| Total | 100.0 parts |

(G) Xenon Light Fastness Test of Recorded Images

Using Glossy paper manufactured by Canon Inc. (trade name Professional Photopaper PR-101) in addition to Glossy paper manufactured by Seiko Epson Corporation and Glossy paper manufactured by HP, a glass plate having a thickness of 2 mm was put so as to provide an air layer on test pieces printed on these glossy papers, irradiation was conducted for 100 hours under conditions of an illuminance of 0.35 W/m$^2$, a humidity of 60% RH and a temperature of 24° C. using a xenon weatherometer Ci4000 (manufactured by ATLAS), and the color difference ($\Delta$E) before and after the test was measured and evaluated. The results are shown in Table 5.

TABLE 5

| | Light fastness |
|---|---|
| Glossy paper manufactured by HP | |
| Example 6-1 | 7.3 |
| Example 6-2 | 10.2 |
| Glossy paper manufactured by Canon Inc. | |
| Example 6-1 | 7.6 |
| Example 6-2 | 16.7 |
| Glossy paper manufactured by Seiko Epson Corporation | |
| Example 6-1 | 13.8 |
| Example 6-2 | 18.5 |

As is clear from Table 5, even when any of the glossy papers is used, Example 6-1 containing the ammonium salt of the present invention exhibits more excellent fastness than Example 6-2 containing the sodium salt of the present invention.

In other words, it is found that, even in the minimum, the coloring matter residual rate of Example 6-1 is 1.3 times that of Example 6-2 when Glossy paper manufactured by Seiko Epson Corporation is used and that, in the maximum, it is 2.2 times that of Example 6-2 when Glossy paper manufactured by Canon Inc. is used, and Example 6-1 is thus more excellent with regard to light fastness.

In addition, using Glossy paper manufactured by HP, water fastness test was conducted under the above conditions. As a result of the test, Example 6-1 is judged as ○$\Delta$ and Example 6-2 is judged as $\Delta$×, which means the degree of blurring is improved by two levels by using the ammonium salt, and it is thus found that it is thus clear that the ammonium salt has more excellent water fastness performance than the sodium salt.

INDUSTRIAL APPLICABILITY

Printed matters printed by inkjet on inkjet special paper or glossy paper provided with an ink receiving layer of porous inorganic substance using an ink composition containing the ammonium salt or the sodium salt, particularly the triammonium salt or the trisodium salt, of the present invention as a coloring matter are excellent in various fastnesses such as light fastness and ozone fastness and also water fastness, and therefore a coloring matter containing the ammonium salt or the sodium salt, particularly triammonium salt or trisodium salt, of the present invention and further, said ammonium salt or sodium salt in an amount of 85% or more are extremely useful as a coloring matter for ink, particularly a coloring matter for ink to be used for inkjet, and an ink using said coloring matter is extremely useful for inkjet printing.

The invention claimed is:

1. An ink composition containing an ammonium salt or a sodium salt of a compound represented by the following formula (1):

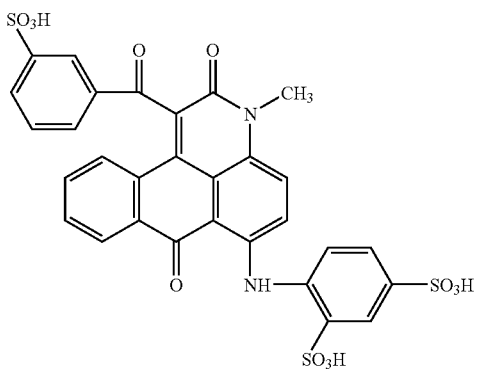

in an area ratio of 85% or more by HPLC relative to the total amount of a coloring matter in the ink composition.

2. The ink composition according to claim 1, wherein the content of the ammonium salt or the sodium salt is an area ratio of 95% or more by HPLC.

3. The ink composition according to claim 1, containing water and a water-soluble organic solvent.

4. The ink composition according to any one of claims 1 to 3, which is for inkjet recording.

5. The ink composition according to claim 1, wherein the content of inorganic components in the coloring matter is 1% by weight or less.

6. The ink composition according to claim 1, wherein the content of the coloring matter is 0.1 to 20% by weight.

7. An inkjet recording method comprising the ink composition according to claim 1 as an ink in an inkjet recording method where recording is conducted on a record-receiving material by discharging ink droplets responding to a recording signal.

8. The inkjet recording method according to claim 7, wherein the record-receiving material is a communication sheet.

9. The inkjet recording method according to claim 8, wherein the communication sheet has an ink image receiving layer containing a porous white inorganic substance.

10. A colored product colored with the ink composition according to claim 1.

11. The colored product according to claim 10, wherein coloring is performed by a printer.

12. An inkjet printer loaded with a container containing the ink composition according to claim 1.

13. An ink composition containing a compound which is a triammonium salt or a trisodium salt of a compound represented by the following formula (1):

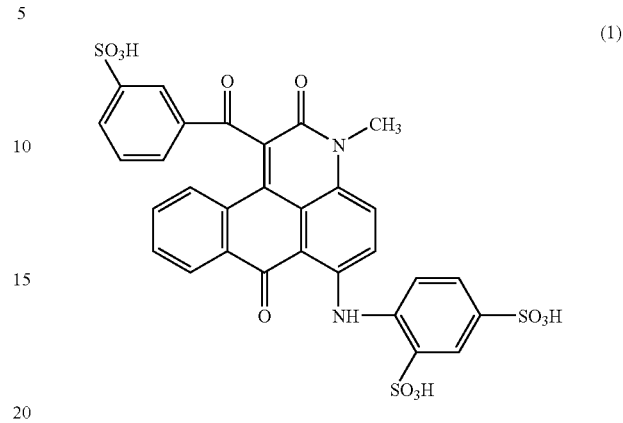

and which has $^1$H-NMR values denoted in the following Table 105 and Table 106:

TABLE 105

| Position Number | Ammonium salt (heavy DMSO) 1H Chemical shift (ppm) | Sodium salt (heavy DMSO) 1H Chemical shift (ppm) |
| --- | --- | --- |
| 1 | 8.21 (1H, m) | 8.23 |
| 2 | 7.89 | 7.89 |
| 3 | 7.50 | 7.49 |
| 4 | 7.89 | 7.89 |
| 5 | 7.81 | 7.83 |
| 6 | 7.63 | 7.62 |
| 7 | 7.71 | 7.72 |
| 8 | 8.46 | 8.49 |
| 9 | 8.00 | 8.01 |
| 10 | 7.76 | 7.78 |
| 11 | 7.42 | 7.42 |
| 12 | 7.58 | 7.58 |
| 13 | 8.14 | 8.15 |
| 14 | 12.12 | 12.14 |
| 15 | 3.76 | 3.78 |
| NH4 | 7.12 | — |

TABLE 106

| Sodium salt (D$_2$O) 1H Chemical shift (ppm) |
| --- |
| 3.72 (3H, s) |
| 12.27 (0.7H, s) |
| 7.42 (1H, m) |
| 7.53 (1H, t) |
| 7.58 (1H, t) |
| 7.66 (1H, d) |
| 7.86-7.90 (2H, m) |
| 7.93-7.96 (3H, m) |
| 8.02 (1H, d) |
| 8.06 (1H, m) |
| 8.24 (1H, d) |
| 8.33 (1H, s) | in an area ratio of 85% or more by HPLC relative to the total amount of a coloring matter in the ink composition, wherein the values denoted in the columns of ammonium salt (heavy DMSO) and sodium salt (D$_2$O) in Tables are values measured respectively in DMSO-d6 at a sample concentration of 5 mg/700 μL and in heavy water (D$_2$O) at a sample concentration of 12 mg/700 μL.

* * * * *